US007945954B2

(12) United States Patent
Coueignoux

(10) Patent No.: US 7,945,954 B2
(45) Date of Patent: May 17, 2011

(54) CONTROLLING ELECTRONIC MESSAGES

(76) Inventor: Philippe J. M. Coueignoux, Tewksbury, MA (US)

( * ) Notice: Subject to any disclaimer, the term of this patent is extended or adjusted under 35 U.S.C. 154(b) by 1217 days.

(21) Appl. No.: 11/220,791

(22) Filed: Sep. 6, 2005

(65) Prior Publication Data

US 2006/0053279 A1 Mar. 9, 2006

Related U.S. Application Data

(60) Provisional application No. 60/607,894, filed on Sep. 7, 2004, provisional application No. 60/608,795, filed on Sep. 10, 2004.

(51) Int. Cl.
*G06F 11/00* (2006.01)
*G06F 12/14* (2006.01)
*G06F 12/16* (2006.01)
*G08B 23/00* (2006.01)

(52) U.S. Cl. ......................................................... 726/22
(58) Field of Classification Search ..................... 726/22
See application file for complete search history.

(56) References Cited

U.S. PATENT DOCUMENTS

| | | | |
|---|---|---|---|
| 5,245,656 A | 9/1993 | Loeb et al. | |
| 5,664,110 A * | 9/1997 | Green et al. | 705/26 |
| 5,884,033 A | 3/1999 | Duvall et al. | |
| 6,052,709 A | 4/2000 | Paul | |
| 6,076,070 A * | 6/2000 | Stack | 705/20 |
| 6,092,197 A | 7/2000 | Coueignoux | |
| 6,101,531 A | 8/2000 | Eggleston | |
| 6,317,838 B1 | 11/2001 | Baize | |
| 6,330,610 B1 | 12/2001 | Docter et al. | |
| 6,460,141 B1 | 10/2002 | Olden | |
| 6,496,936 B1 | 12/2002 | French et al. | |
| 6,581,072 B1 | 6/2003 | Mathur et al. | |
| 6,609,196 B1 | 8/2003 | Dickinson et al. | |
| 6,691,156 B1 | 2/2004 | Drummond et al. | |
| 6,741,980 B1 | 5/2004 | Langeseth et al. | |
| 7,343,624 B1 * | 3/2008 | Rihn et al. | 726/24 |
| 7,363,490 B2 * | 4/2008 | Paulsen et al. | 713/154 |
| 7,406,504 B2 * | 7/2008 | Paul | 709/206 |
| 7,472,093 B2 * | 12/2008 | Juels | 705/80 |
| 7,620,691 B1 * | 11/2009 | Goldman et al. | 709/206 |

(Continued)

OTHER PUBLICATIONS

"ASR Overview", former website at turntide.com, downloaded in May 2004.

(Continued)

*Primary Examiner* — Farid Homayounmehr
(74) *Attorney, Agent, or Firm* — Brown Rudnick LLP

(57) ABSTRACT

A receiver is shielded from undesirable electronic messages, sometimes referred to as "spam", by requiring any sender who wants to send an electronic message to the receiver to first submit to a filter. The filter is specified by the receiver. The receiver-specified filter can be downloaded to the sender's computer and executed on the sender's computer. By execution, the filter elicits information from the sender and uses it without disclosing it to authorize, or not, the sending of electronic messages (such as email) from the sender to the receiver. Another embodiment according to the invention allows a sender to prevent undesirable receivers from viewing the sender-sent electronic messages by requiring any receiver who wants to view an electronic message from an authorized sender to first submit to a filter. One or more third parties can be involved. For example, senders can be recommended to and/or approved for receivers by one or more certifying third parties, and receivers can be recommended to and/or approved for senders by one or more certifying third parties.

41 Claims, 15 Drawing Sheets

U.S. PATENT DOCUMENTS

| | | |
|---|---|---|
| 2002/0120600 A1* | 8/2002 | Schiavone et al. ............. 707/1 |
| 2002/0129111 A1 | 9/2002 | Cooper |
| 2002/0138581 A1 | 9/2002 | MacIntosh et al. |
| 2002/0174185 A1 | 11/2002 | Rawat |
| 2002/0178229 A1 | 11/2002 | Sinha et al. |
| 2002/0184096 A1* | 12/2002 | Kawahara et al. ............. 705/14 |
| 2003/0023736 A1 | 1/2003 | Abkemeier |
| 2003/0061508 A1 | 3/2003 | Bhat |
| 2003/0105978 A1 | 6/2003 | Byrne |
| 2003/0167402 A1 | 9/2003 | Stolfe et al. |
| 2003/0191969 A1 | 10/2003 | Katsikas |
| 2003/0200267 A1 | 10/2003 | Garrigues |
| 2004/0128498 A1 | 7/2004 | Lang et al. |
| 2004/0133793 A1 | 7/2004 | Ginter et al. |
| 2004/0267886 A1* | 12/2004 | Malik ............. 709/206 |
| 2005/0193076 A1* | 9/2005 | Flury et al. ............. 709/206 |
| 2005/0203800 A1* | 9/2005 | Sweeney et al. ............. 705/14 |
| 2006/0031314 A1* | 2/2006 | Brahms et al. ............. 709/206 |

OTHER PUBLICATIONS 3-page International Search Report from PCT/US2005/31874.

5-page Written Opinion from PCT/US2005/31874.

* cited by examiner

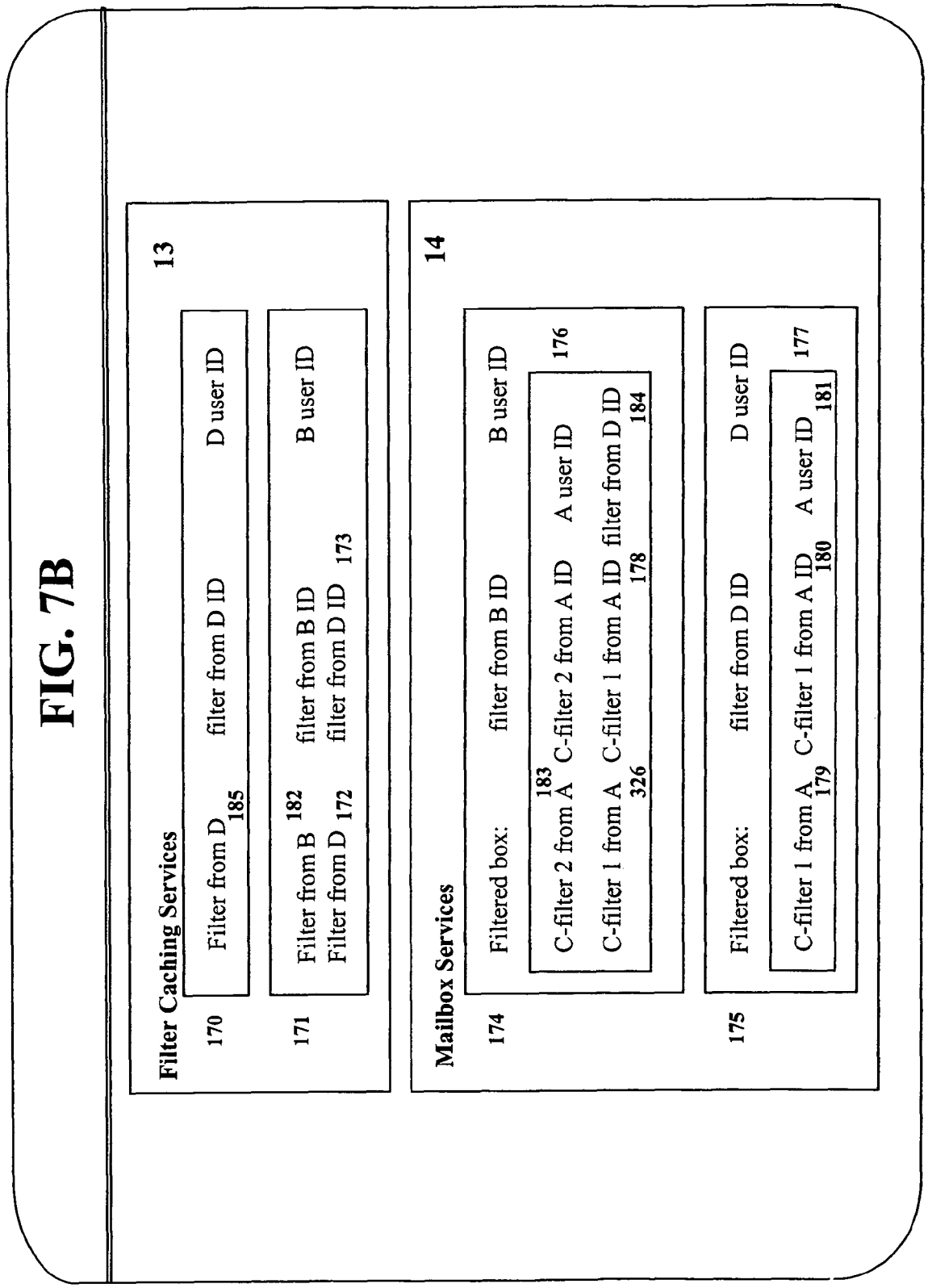

CONTROLLING ELECTRONIC MESSAGES

CROSS REFERENCE TO RELATED CASES

This claims priority to and the benefit of provisional U.S. patent application Ser. No. 60/607,894 filed on Sep. 7, 2004. This also claims priority to and the benefit of provisional U.S. patent application Ser. No. 60/608,795 filed on Sep. 10, 2004. Both of these provisional U.S. patent applications are incorporated herein by reference, and U.S. Pat. No. 6,092,197 also is incorporated herein by reference.

TECHNICAL FIELD

The invention generally relates to preventing undesirable electronic messages, sometimes referred to as spam when the electronic messages are email, from being sent. Electronic messages can be electronic mail or email that are sent between computers over a computer network, but electronic messages can include more than just emails. Electronic messages can include any type of messages that are electronically communicated over any type(s) of communications network(s) and between or among any type(s) of communication device(s).

BACKGROUND INFORMATION

The exchange of email over the Internet and other networks has become an ordinary activity in world of business and also in people's personal lives. Unfortunately, the lack of a real cost of sending an email to a receiver's electronic address, combined with the increasing availability of such address lists, leads to a high percentage of undesirable emails. For the receiver and the intermediary service providers, the undesirable emails, which have become known as spam, result in a significant expenditure of time and money in order to extract the desirable messages from the background noise of undesirable ones. For the senders, the same phenomenon decreases the value of email as a communication channel, as any desirable messages they send to receivers tend to become lost in the sea of spam or otherwise ignored by the receivers.

One way to fight spam is to use technical means to filter out the undesirable emails from all of the received emails. With some known email filtering programs, the header of the sent email, its title or subject, and/or its content is analyzed.

SUMMARY OF THE INVENTION

A better way to deal with unwanted electronic messages (e.g., email spam) is to stop such messages before they are even sent, as opposed to trying to identify the undesirable messages after they are sent or received from the totality of all the electronic messages that were sent or received. Also, by allowing each receiver to determine or set the parameters of an acceptable electronic message and/or a sender from which the receiver is willing to accept electronic messages, the receiver can at least improve the likelihood, if not guarantee, that electronic messages that are received by the receiver are electronic messages that are desirable to and welcomed by the receiver. In this manner, unwanted electronic messages are eliminated, or at least reduced, and thus total electronic message traffic over the network(s) between the senders and receivers is reduced. The electronic messages can be email but also can include any type of messages that are electronically communicated over any type(s) of communications network(s) and between or among any type(s) of device(s) such as computers, cellular phones, handheld devices, etc.

A receiver can be shielded from unwanted electronic messages by requiring any sender who wants to send an electronic message to the receiver to first submit to a filter. The filter is specified by the receiver. The receiver-specified filter can be downloaded to the sender's computer and executed on the sender's computer. By execution, the filter elicits information from the sender and uses it to authorize, or not, the sending of electronic messages from the sender to the receiver. Another embodiment according to the invention allows a sender to prevent undesirable receivers from viewing the sender-sent electronic messages by requiring any receiver who wants to view an electronic message from an authorized sender to first submit to a filter. One or more third parties can be involved. For example, senders can be recommended to and/or approved for receivers by one or more certifying third parties, and receivers can be recommended to and/or approved for senders by one or more certifying third parties.

In one aspect, the invention relates to a method of preventing certain senders from sending electronic messages to a receiver. The method comprises the step of preparing, by the receiver, a filter that allows transmission of electronic messages only from senders that are acceptable to the receiver. The filter includes a communication for potential senders, and the filter also includes a criterion for applying to a response to the communication that is provided by each of the potential senders to determine if any of the potential senders are acceptable to the receiver. At least one of the responses that is provided as a result of using the filter is undisclosed to anyone including the receiver, except that the particular providing potential sender is privy to its, his, or her provided response(s) because it is that potential sender that provided the response(s) in the first instance. The method also comprises the step of making the filter available to the potential senders, and the method comprises the step of receiving electronic messages only from the one or more potential senders that are acceptable to the receiver as determined by application of the criterion to the provided responses.

Embodiments according to this aspect of the invention can include the following features. The provided responses can be unknown to the receiver prior to the responses being provided by the potential senders. The making step can comprise making the filter directly or indirectly available to the potential senders. The filter can be made directly available to the potential senders by sending the filter to the potential senders, and it can be the receiver or some other person or entity that sends the filter to the potential senders. The filter can be sent to the potential senders after a request is made to the potential senders and/or after the potential senders request the filter to be sent. The filter can be made indirectly available to the potential senders by providing the filter at a location other than the location of the receiver, and, for example, allowing the potential senders to download the filter from that location. The preparing step can comprise building the filter without the aid of a filter template, or it can comprise using a filter template to build the filter. The communication for the potential senders can comprise a question, a statement, or a request, for example. The criterion for applying to a provided response can include Boolean logic. The filter can comprise an expiration date after which any attempt to apply the filter (by a potential sender, for example) will fail. The filter can include a plurality of communications for the potential senders and also a plurality of criteria, where each of the communications is associated with one of the criteria. The potential senders' responses can be stored, or at least some or one of the provided responses can be stored, and it or they can be stored at a location other than the location of the receiver. The stored response(s) can be used automatically when the filter is applied to the same potential sender in the future. The stored response(s) can be used automatically when another filter is applied to the same potential sender in the future, where the other filter includes the same communication as the filter.

In another aspect, the invention relates to a method of using a receiver-defined filter to determine if an electronic message is acceptable to a receiver. The method comprises the step of accessing a filter that allows transmission of electronic messages only from senders that are acceptable to the receiver, the filter having been defined, at least in part, by the receiver. The filter including a communication for potential senders, and the filter further including a criterion for applying to a response to the communication that is provided by each of the potential senders to determine if any of the potential senders are acceptable to the receiver. The method also comprises the step of one of the potential senders that accesses the filter providing at least one response to the communication, where the at least one response is undisclosed to anyone, including the receiver, except that the particular providing potential sender has possession and knowledge of the response. The method also comprises the step of sending at least one electronic message from the particular providing potential sender to the receiver if the application of the criterion to the at least one response indicates that the particular providing potential sender is acceptable to the receiver.

In yet another aspect, the invention involves a system for generating and providing filters used to control the transmission of electronic messages. The system comprises a filter generator and a filter provider. The filter generator is for use by a receiver to define a filter that allows transmission of electronic messages only from senders that are acceptable to the receiver, the filter including a communication for potential senders and the filter further including a criterion for applying to a response to the communication that is provided by each of the potential senders to determine if any of the potential senders are acceptable to the receiver. At least one of the provided responses is undisclosed to anyone including the receiver except the particular providing potential sender. The filter provider provides the filter to at least one of the potential senders to allow the at least one of the potential senders to use the filter and provide at least one response to the communication, the at least one response being undisclosed to anyone including the receiver except the particular providing potential sender.

In still another aspect, the invention features a system for preventing unwanted electronic messages from being sent. The system comprises a sender computing device and a receiver computing device. The sender computing device is configured to apply a filter to gather from at least one potential sender at least one response to a communication for potential senders, and to keep undisclosed the at least one gathered response from anyone including the receiver except the at least one potential sender. The sender computing device also is configured to apply a criterion included with the filter to the at least one gathered response to determine if the at least one potential sender is acceptable to the receiver. The receiver computing device is configured to define at least some aspects of the filter, and to receive electronic messages only from the one or more potential senders that are acceptable to the receiver as determined by application of the filter and the criterion.

Embodiments according to one or more of these other aspects of the invention can include one or more of the features described above in this section.

Thus, it can be seen that the invention can take the form, in some instances, of a system and/or a method that shields receivers from undesirable email (which is sometimes referred to as spam) or any other undesirable electronic messages. Any sender wanting to send an email to a receiver can be required first to submit to a filter. The filter, which has been specified for this purpose by the receiver, can be downloaded by the sender and executed on the sender's computer, and by execution the filter extracts from the sender information known only to the sender and uses the extracted information to authorize, or not, the sending of the email from the sender to the receiver(s). The extracted information is not disclosed to anyone (but the sender of course knows and has access to the extracted information because it comes from the sender) unless explicit authorization is requested by, and granted to, another party. It is the sender and/or the sender's designated representative or proxy to which the authorization request is directed.

Described below are some of the possible embodiments, objects, features, and/or advantages according to the invention. Still others are possible even if not expressly recited herein. Nothing in this section or elsewhere in other sections should be taken to be limiting on the invention, because all information provided herein is illustrative and not restrictive.

In one embodiment, a system according to the invention can include a sender using a confidential sending agent and a receiver using a receiving agent, both agents comprising a processing module and a memory module. The receiving agent is able, following the specification of the receiver, to edit a filter that comprises, besides optional representations to guide the sender, at least one query about a fact to be provided by the sender and at least one criteria to be checked against the facts resulting from such queries. The receiving agent makes this filter available for downloading by the receiver in a format only understood by the sending agent. After downloading the filter, the sending agent holds it in confidence and executes it, displaying its representations to the user, gathering and storing the facts revealed by the sender in response to its queries and determining if the facts meet its criteria. If this determination is positive, the sending agent authorizes the sender to send one message to the receiver. The sending agent guarantees that none of the facts revealed by the sender are made available to anyone else, i.e. the receiver and any other third party. Finally the message, if authorized by the filter and sent by the sender to the receiver, is received by the receiving agent to be displayed to the receiver.

In another embodiment, a system according to the invention can be implemented with the help of third parties which offer any or all of the following services: ready made templates to facilitate the declaration of filters by receivers, directories of filter addresses to facilitate the locating of receivers' filters by senders, filter caching and mailboxes to help receivers offer permanent availability to senders without tying up their own computers.

Both sender and receiver can have a sending agent and a receiving agent, and both agents can be confidential. The receiving agent can manage a plurality of filters to account for different needs of the receiver.

The sending and the receiving agents can share the definitions of a vocabulary of facts to simplify the specification and operation of filters by allowing the sender to answer the receiver's queries in advance of downloading the receiver's filter and store these answers in a permanent profile from which they can be retrieved automatically upon execution of the filter by the sending agent. Both the sender and the receiver agents can make reference to a plurality of vocabularies, each attached to a particular domain.

The sender can prepare a message common to a plurality of receivers and direct the sending agent to download and process the filters corresponding to these receivers and send the message to those whose filters have granted authorization, all in an automatic way.

The receiver may request the sender to publish some of the facts revealed to the sending agent, i.e. to make those facts known to the receiver by the sending agent with the explicit authorization of the sender.

In yet another embodiment, a system according to the invention can include sending and receiving agents that possess further capabilities besides the ones previously described to enable the sender to hide the message to unsuitable receivers. Prior to downloading a filter, the sending agent is further able, following the specification of the sender, to edit a counter-filter which comprises, besides optional representations to guide the receiver, at least one query about a fact to be provided by the receiver and at least one criteria to be checked against the facts resulting from such queries. The sending agent attaches the counter-filter to the message in a format only understood by the receiving agent and sends them both to the receiver when the sending agent is authorized by the receiver's filter to send a message to the receiver. After downloading the counter-filter together with the message, the receiving agent holds it in confidence and executes it, displaying its representations to the user, gathering and storing the facts revealed by the receiver in response to its queries and determining if the facts meet its criteria. If this determination is positive, the receiving agent authorizes the receiver to view the message and to send a reply to the sender. The receiving agent guarantees that none of the facts revealed by the receiver are made available to anyone else, i.e. the sender and any other third party. Finally the reply, if authorized by the counter-filter and sent by the receiver to the sender, is received by the sending agent to be displayed to the sender.

The sender may further request the receiver to publish some of the facts revealed to the receiving agent, i.e. to make those facts known to the sender by the receiving agent with the explicit authorization of the receiver. The facts for which authorization has been granted can be sent together with the reply of the receiver to the sender when the counter-filter has authorized it.

Upon receipt from the receiver of the reply and the attached facts published by the receiver, the sender may further send a confirmation to the receiver. The facts requested by the receiver for which the sender has granted authorization can be sent together with this confirmation.

In one embodiment, the system can further include a third-party recommender, known by reference to both the sender and the receiver and whose receiving agent maintains a list of recommended senders that contains a reference to the sender. The recommender's receiving agent further edits a filter, called the recommender's filter, which can check whether the agent that has requested the recommender's filter is in this list or makes a specific reference to a sender in this list. On the other hand the sender's sending agent maintains a list of recommending parties and the receiver's receiving agent maintains a list of trusted recommending parties that contains a reference to the recommender. The receiver's receiving agent further edits a filter, called the receiver's filter, which, among other things, checks whether this list of trusted recommended parties shares an entry with the list of recommending parties of a sender. The sender's sending agent further edits a counter filter. When the sender's sending agent downloads the recommender's filter and fulfills its criteria, the sending agent is allowed to enter the known reference to the recommender into the sender's list of recommending parties. When the sender's sending agent downloads the receiver's filter and fulfills its criteria, it writes a reference to the sender and the known reference to the recommender into the sender's counter-filter and sends it to the receiver, attached to the sender's message. When the receiver's receiving agent downloads the counter filter and the counter-filter gives its authorization, the receiver's receiving agent uses the known reference to the recommender contained in the counter-filter to fetch the recommender's filter and the specific reference to the sender contained in the counter-filter to be checked against the recommender's filter. If the recommender's filter fulfills its criteria, the receiver's receiving agent displays the sender's message to the receiver, otherwise it eliminates it.

In some embodiments that include a third party as described above, the recommender's receiving agent can further maintain a list of recommended receivers which contains a reference to the receiver to whom the recommender proposes to introduce the sender. The recommender's filter can further contain a copy of this list of recommended receivers. The sender's sending agent can further maintain a list of third-party recommended receivers. When, upon download by the sender's sending agent, the recommender's filter successfully checks that the sender is referenced in its list of recommended senders, it can cause the sender's sending agent to copy the list of recommended receivers from the recommender's filter into the list of third-party recommended receivers of the sender's sending agent, which can be used to send a message to the receivers mentioned.

In some embodiments that include a third party as described above, the system can further include a fourth party to be represented by the receiver and to whom the receiver addresses suitable senders. The receiver uses a sending agent that maintains a list of recommended receivers including a reference to the fourth party. The receiving agent of the fourth party further edits a filter, called the to be represented filter, which checks whether this fourth party is referenced in the list of recommended receivers of the agent that has requested it. When, upon download by the receiver's sending agent, the to be represented filter fulfills its criteria, the receiver's sending agent is allowed to attach the to be recommended filter to a representing filter, which checks whether the list of trusted recommended parties maintained by the receiver's receiving agent shares an entry with the list of recommending parties of a sender. When the sender's sending agent happens to fetch the representing filter of the receiver, it now receives both the representing filter and the to be represented filter. The sender's sending agent first processes the to be represented filter, ignoring the special check against the list of recommended receivers. If this processing concludes without the need to check against the list of recommending parties held by the sender's sending agent, the sender's sending agent ignores the representing filter entirely and, if authorized by the to be represented filter, sends a message directly back to the represented party. If on the contrary, during the processing of the to be represented filter, the need arises to evaluate a match against the list of recommended parties, this criteria is ignored but if the result of the evaluation is positive, the sender's sending agent further processes the representing filter. If the evaluation of this representing filter is positive also, the sender's sending agent then sends a package to the receiver comprising, a first counter filter containing a reference to the sender and the known reference to the recommender and a second counter filter to which the message from the sender to the represented party is attached. Upon receipt, the receiver's receiving agent uses the first counter filter to ask the recommender to verify the recommendation and, if the answer is positive, forwards the second counter filter with the message attached to the represented party.

In some embodiments according to the invention, a third party can act as a certification authority. In these embodiments, the sender's sending agent can receive and to hold a certification list making a reference to at least one sender's fact as provided by the sender and a certificate issued by the certification authority covering the accuracy of all facts referenced by the certification list. The receiver's receiving agent can edit a filter which comprises at least a criteria containing a list of references to sender facts to be checked for inclusion in a sender's certification list, possibly a second criteria matching the receiver's preferences against certificate information such as name of certifying authority, certification date, certification stamp. The receiver may include a request to the sender to publish the same certificate information back to the receiver so that, when in receipt of the information from the sender, the receiver may verify the validity of the certificate with the certification authority who issued it to the sender.

In some instances, the sender's sending agent, when authorized by the receiver's filter, can secretly compute an authorization code unique to the filter, sender pair that it appends to the message sent to the receiver. The receiver's receiving agent can depend on a third party to compute the authorization code independently and compare it to the one produced by the sender's sending agent. If the comparison fails, the message is not displayed to the receiver as intended by the sender.

In some instances, the sender's sending agent can be located in a tamper-resistant environment, which protects the secrecy of the computation of the authorization code by the sending agent from any violation, especially a violation by the sender. This tamper-resistant environment is itself subject to the same confidentiality requirement applying to the sender's sending agent.

Counter filters also can be protected by a secret-based authorization code and the receiver's receiving agent can be located in a tamper-resistant environment in order to protect the secret from attack by the receiver or any other party.

The foregoing and other objects, features, and advantages of the invention will become apparent from the following, more particular description of certain embodiments according to the invention, as illustrated in the accompanying drawings.

BRIEF DESCRIPTION OF DRAWINGS

The drawings are not necessarily to scale, and the drawings generally illustrate principles relevant to the invention that can help in understanding the invention.

FIGS. 7A and 7B detail the additional data structures of the system according to one embodiment of the present invention for enabling introductions by a third party and representations on behalf of a fourth party, using spam free email.

DESCRIPTION

Figure 1A:
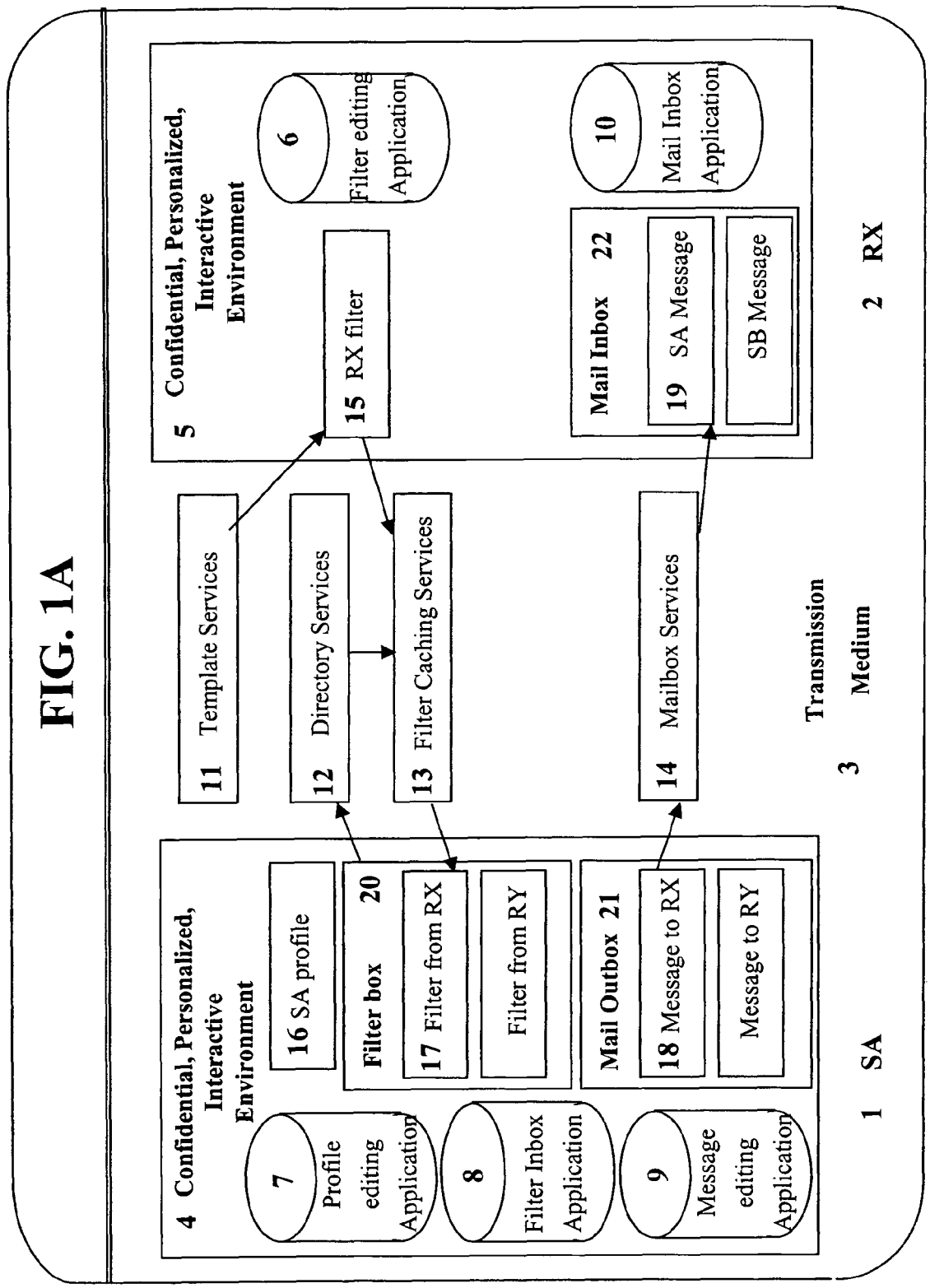
FIG. 1A is a block diagram of the system according to one embodiment of the present invention for achieving spam free email.
Figure 1B:
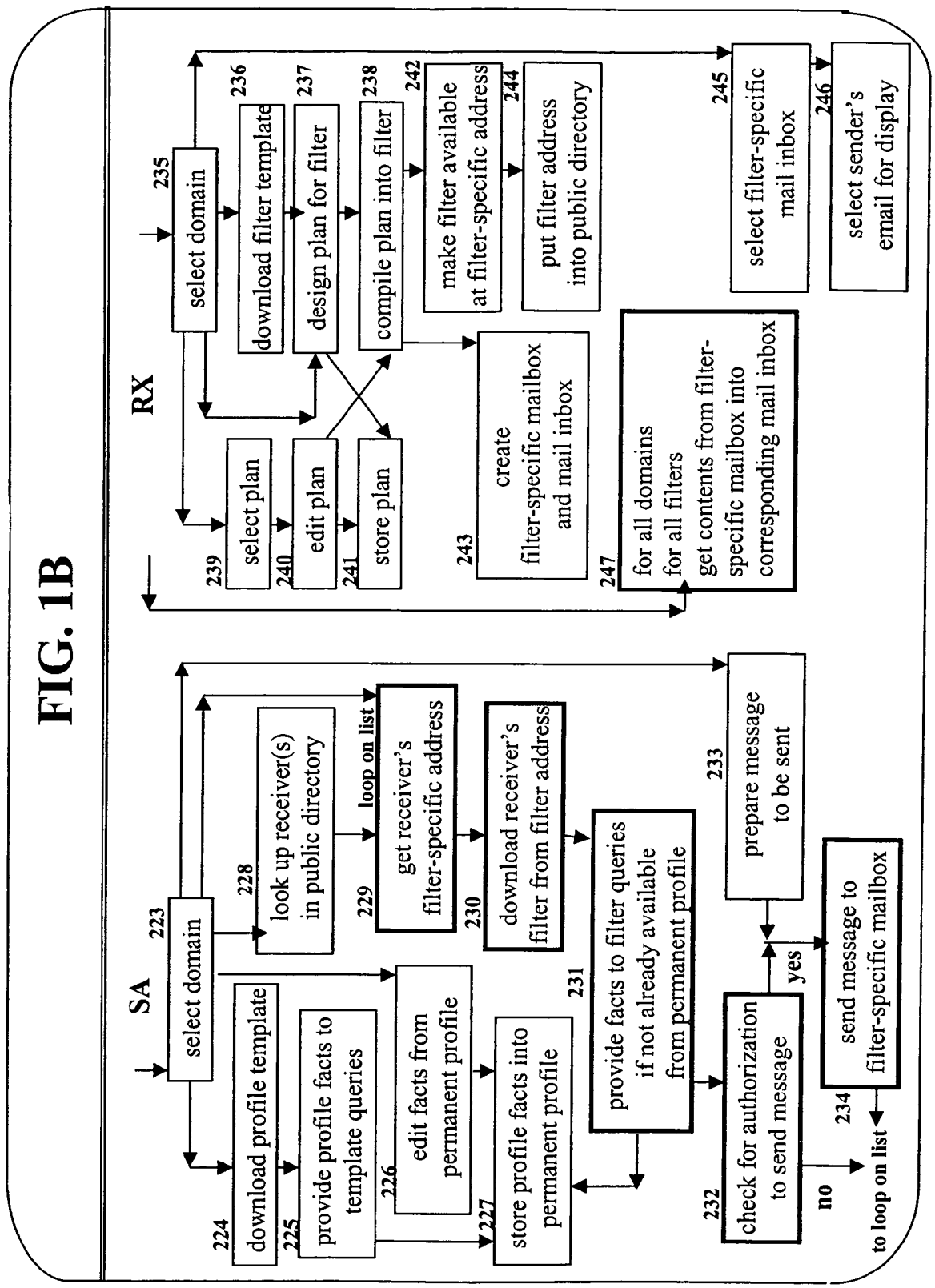
FIG. 1B is an embodiment of a flow chart to accompany FIG. 1A.

Referring now to FIGS. 1A and 1B, shown is a block diagram of a system according to one embodiment of the invention for achieving spam-free email. This system is described, for purposes of illustration only, as being implemented on a software programmable computer system using an object-oriented programming language such as Sun Java. The software-programmable computer system can be connected to the Internet. It is to be appreciated, however, that the present invention can be implemented in the context of other networks such as, for example, wide area networks WAN, local area networks LAN, intranets, cellular phone networks, and also on other computer or programmable hardware known to hardware designers skilled in the art and using other computer languages known to software programmers skilled in the art and for other text messaging applications. The present invention can further be implemented in the context of other, non text-based messaging applications, such as voice-based messaging and communication between smart phones, as a mechanism to determine whether or not to allow a sender to start emitting.

As shown, a sender (SA) 1 desires to send an electronic message or email to a receiver (RX) 2 through a transmission medium 3. The sender 1 can be a personal computer using the Windows operating system or some other type of operating system, a workstation, or any other type of computing device with at least a processor, memory, and input/output (I/O) devices and capabilities. For example, the sender 1 can be a laptop or a desktop computer running Windows XP and having a display screen, a mouse and/or other pointing device, a keyboard, a hard disk drive, a CD-ROM drive, RAM, ROM, a processor, etc. The receiver 2 also can be any such computing device. The sender 1 and the receiver 2 do not need to be the same type of computing device. The applications and functionality described herein can be achieved by one or more software programs residing on the computing device, whether it be the sender 1 or the receiver 2. The program(s) can be on the hard disk of the computing device, on a CD-ROM and accessed by use of the CD-ROM drive of the computing device, within the RAM of the computing device, and/or stored in or on any other type of computer readable medium. In operation, some of the program(s) can reside on the hard disk and some in RAM as is typical when a software program is executing on a computing device. The transmission medium 3 can be any type of communications network and/or channel such as the Internet, a WAN, a LAN, an intranet, a cellular telephone network, etc. The transmission medium 3 can include one or more links and/or one or more different types of networks between the sender 1 and the receiver 2.

Each of the SA 1 and RX 2 can be used by an individual, acting on his or her own behalf or as a member of some organization. Alternatively, the sender 1 and/or the receiver 2 can execute a computer program to carry out orders automatically according to some authority without the need for real-time human interaction with the sender 1 and/or receiver 2 computing devices. Instead of a computer program for automating the behavior of the sender 1 and/or the receiver 2, the sender 1 and/or the receiver 2 can be made to act in an automated fashion by some other type of controlling hardware and/or software.

At times, the word "sender" is used to refer to the person using the sender 1 computing device, and the word "receiver" is used to refer to the person using the receiver 2 computing device. At other times, the word "sender" or SA is used to refer to the sender 1 computing device itself, and the word "receiver" or RX is used to refer to the receiver 2 computing device itself. It should be clear herein, at least from the context, whether any particular reference is to a computing device or an actual person.

Both the sender 1 and the receiver 2 have at their disposal one copy of a confidential, personalized, interactive environment, copy 4 for the sender 1 and copy 5 for the receiver 2. The function of such an environment is to receive and store applications and allow them to interact with at least one user, respectively SA 1 for copy 4 and RX 2 for copy 5, discovering private information from said user and exploiting said information while guaranteeing privacy, i.e. that no piece of said private information about said user is published, i.e. made available, to any one else unless said user has given his or her explicit authorization for doing so. Such an environment is fully described in U.S. Pat. No. 6,092,197 and also in the corresponding European Patent Application No. 98935494.9, each of which is hereby incorporated by reference herein in its entirety.

In one embodiment described in U.S. Pat. No. 6,092,197 and also European Patent Application No. 98935494.9, this environment, located on the user computing device and in communication with a remote data processing system, comprises a discovery and exploitation rule engine operating with a knowledge base of dialog classes which have been transmitted by the remote data processing system and user related facts, the rule engine interfacing with the user and initiating prompts to the user, including prompts asking the user to reveal facts and to provide information enabling the rule engine to determine whether a revealed fact is to be outbound as a public fact which the user authorizes for publication to the remote data processing system, or a private fact which is not to be published. The rule engine stores in the knowledge base the facts revealed by the user together with information indicating whether they are private or public facts, the rule engine transmits to the remote data processing system only the public facts, and the rule engine processes both the private and the public facts so as to exploit the facts and thus determine additional prompts which are provided to the user or present information to the user, wherein the private facts cannot be accessed by a system element other than the rule engine. The present invention can, for example, use such a remote data processing system to distribute the software applications to all users as classes organized into dialogs to be run by the rule engine and relay the interactions between each user with other users and potential third party services, each application receiving from the rule engine the power to interface with the local user (interactivity feature), access and process all facts provided by this user (personalization feature), communicate to the remote data processing system all facts which the user explicitly wishes to send out but being prevented by the same rule engine from publishing any fact the user wishes to keep private (confidentiality feature).

The present invention describes five such applications, respectively the filter editor 6, the profile editor 7, the filter inbox 8, the message editor 9 and the mail inbox 10. Applications 6 and 10, i.e. the receiving agent, reside in environment 5 and applications 7, 8, and 9, i.e. the sending agent, in environment 4. It is important to note, as will become apparent from the sequel to the software programmer skilled in the art, that it is not necessary to split said agents between 6 and 10 on the one hand and 7, 8, and 9 on the other hand except for the clarity of the description. Similarly, it is not necessary to split between said sending and said receiving agent, each practical user acting as a sender or as a receiver according to circumstances. Finally it is not necessary to split between the agents and the environment in which they reside as long as the functional characteristics of said environment are enforced. In one embodiment, both agents, i.e. applications 6, 7, 8, 9, and 10, are in fact made available to users together with a copy of said environment as a single trusted applet. From an opposite point of view, it is still an embodiment of this invention, even if it is not recommended, when applications 6 and 10, i.e. the receiving agent, are implemented outside of environment 5.

Using a filter editing application 6, receiver (RX) 2 further declares a filter 15, containing the conditions that a sender must satisfy to be allowed to send a message to said receiver 2 (steps 237-238). The nature of such conditions is only constrained by the ability of said receiver to express them and the necessity to evaluate them within environment 4 under a filter inbox application 8. In particular such a condition can refer to a fact only known to sender 1 as long as said filter 15 includes a query for sender 1 to provide the answer. For example one condition can be that said sender like bicycle riding or have attended West Point, or that said sender be against abortion or against firearm sales regulation, or that said sender suffer from urinary incontinence or erectile dysfunction, or that sender be able to provide information on such specific subjects. It is important to remember that the corresponding facts as provided by the sender in response to such queries are not made available to anyone else. Hence there is no limit to the private nature of the topic raised. It is further possible to use as a condition that said sender legally acts on behalf of a known government branch such as the IRS or the Massachusetts Department of Motor Vehicles, or a known brand name such as Amazon.com or Ford Motors. It is further possible to use as a condition the knowledge of some key shared by sender 1 and receiver 2, one example being a unique reference given to sender 1 by a third party operator and communicated in advance by sender 1 to receiver 2, another example being a reference unique to some third party acting as a recommender for sender 1 and recognized by receiver 2. It is further possible to ask that sender 1 be ready to provide at least a certain amount of money for the privilege to send an email to receiver 2. Finally filter 15 may freely combine said conditions according to Boolean algebra.

Given the potential complexity of filter 15, one implementation involves allowing receiver (RX) 2 to download a ready made filter template from third party service 11 (step 236).

While such a template may limit the choice of receiver 2 in building filter 15, using for example a closed list of desirable topics or known brand names as predetermined by third party service 11, it makes receiver 2's task of preparing filter 15 much simpler by clicking on a few check marks and filling in a few text fields. Receiver 2 further takes any means to make known the address at which filter 15 will be available for download by senders (step 242). It is in particular possible for receiver 2 to communicate this address to desirable senders on an as needed basis only. One embodiment according to the invention involves allowing third party service 12 to maintain a directory on line, translating an address for receiver 2 either already well known, such as receiver 2's current Internet email address, or easy to guess, such as john.doe@boston-directory-services.net, into the address of filter 15 (step 244). Receiver 2 is further asked by environment 5, according to its privacy capability, to provide an explicit authorization in order to release filter 15, under an encrypted format readable by filter inbox application 8 in environment 4, to the public. Receiver 2 stores filter 15, in said encrypted format, at any place potentially accessible from the Internet. This can be on receiver 2's own computer, using for example a local web server. In another embodiment, third party service 13 offers a public filter cache on line to that effect.

Using filter inbox application 8, sender (SA) 1 further requests a copy of filter 15 to be downloaded as filter from RX 17 into filter box 20 (step 230). To that effect sender 1 provides filter inbox application 8 with the address at which, directly or indirectly, a public copy of filter 15 is to be found (step 229), for example using a well known address that directory service 12 uses to call filter caching service 13 directly to effect delivery (step 228). Filter inbox application 8 is further responsible for the interpretation of filter from RX 17, using the discovering capability provided by environment 4 to ask sender 1 for the value of any fact private to sender 1 (step 231) and the exploiting capability to determine if sender 1 fulfills the conditions specified by receiver 2 to receive a message from sender 1 (step 232). If this determination is negative, filter from RX 17 is purged from filter box 20 and sender 1 is denied the possibility to send a message to receiver 2. If this determination is positive, filter inbox application 8 provides message editing application 9 with the authorization and information necessary for sender 1 to send one message to receiver 2 in response to filter 15.

Further using the exploiting capability of environment 4, filter inbox application 8 stores the facts provided by sender (SA) 1 into SA profile 16 for later access (step 227), thus avoiding to put any query to sender 1 for which the answer is already known (step 231). To ensure SA profile 16 is always up to date, profile editing application 7 lets sender 1 view and update SA profile 16 on demand (steps 226-227). Profile editing application 7 may be defined so that certain facts belonging to SA profile 16 may not be updatable by sender 1, for example a reference unique to sender 1 and provided by a third-party registration service not represented in FIGS. 1A and 1B. Since it makes sender 1's task much simpler when sender 1 does not have to answer a single query in order for filter inbox application 8 to process filter from RX 17, one embodiment according to the invention involves allowing template service 11 to offer its template for download by sender 1 as a neutral filter state, i.e. containing all the queries but no condition unless for checking profile consistency, so that sender 1 can choose to pre-populate SA profile 16 with all the answers expected by filter 15 when receiver 2 has chosen to derive it from the corresponding template (steps 224, 225, 227).

Using message editing application 9, sender 1 is able to edit a message to RX 18 into mail outbox 21 (step 233). With proper input from filter inbox application 8 and after having received the explicit authorization of sender 1 to release the content of message to RX 18 as well as any ancillary information, message editing application 9 is allowed to upload message to RX 18 to an address used by receiver 2 to receive mail (step 234). In an embodiment of this invention, receiver 2 may communicate the final address of receiver 2's mail inbox 22 together with filter 15. In another embodiment, mailbox service 14 is used as an intermediary. The filter caching service 13 and mailbox service 14 can cooperate so that filter inbox application 8 learns the address of mailbox service 14 directly from filter caching service 13 upon filter download, filter 15 itself being independent of any caching information. The content of message to RX 18, being independent of the authorization computed from filter from RX 17, may be prepared and authorized for publication by sender 1 in advance of asking filter inbox application 8 to download filter from RX 17. Assuming the required information is already stored in SA profile 16 and authorization is forthcoming, the software programmer known in the art sees that applications 8 and 9 can be built and services 12, 13 and 14 delivered so that sender 1 can send message to RX 18 by simply typing in the well known address of receiver 2. It is important to remember that the privacy capability of environment 4 guarantees that no information from SA profile 16 has been made available to anyone, third-party service providers included, to the possible exception of an ancillary service variable, such as the unique reference given to sender 1 by filter caching service 13 to discharge its service, for which authorization has been obtained from sender 1 as a matter of course.

Finally using mail inbox application 10, receiver 2 consults mail inbox 22, which, if such third party is used, in turn fetch the messages available from mailbox service 14 (steps 247, 245). Among such messages receiver 2 will receive in good time and view SA message 19, copy of message to RX 18 (step 246).

Referring now to U.S. Pat. No. 6,092,197 and also to the corresponding European Patent Application No. 98935494.9, both of which are incorporated herein by reference, particularly to FIGS. 3 and 4 thereof, it will be apparent to a software engineer skilled in the art that the so-called discovery and exploitation engine DEP, while a rule-based interpreter, can emulate the basic IF . . . THEN programming structure and hence any traditional software logic, including WHILE. DO iterations, as long as this logic respects the privacy capability of environment 5. The logic structures of applications 6 to 10 will therefore not be detailed whenever it follows from the description of their major data structures in a way straight-forward to a software engineer skilled in the art. As an example, for each list structure, one can design add, sort, report, select, paste and delete operations; for a list structure referencing a second list structure, one can design a paste reference into first list operation, coming after a select from second list operation.

Figure 2:
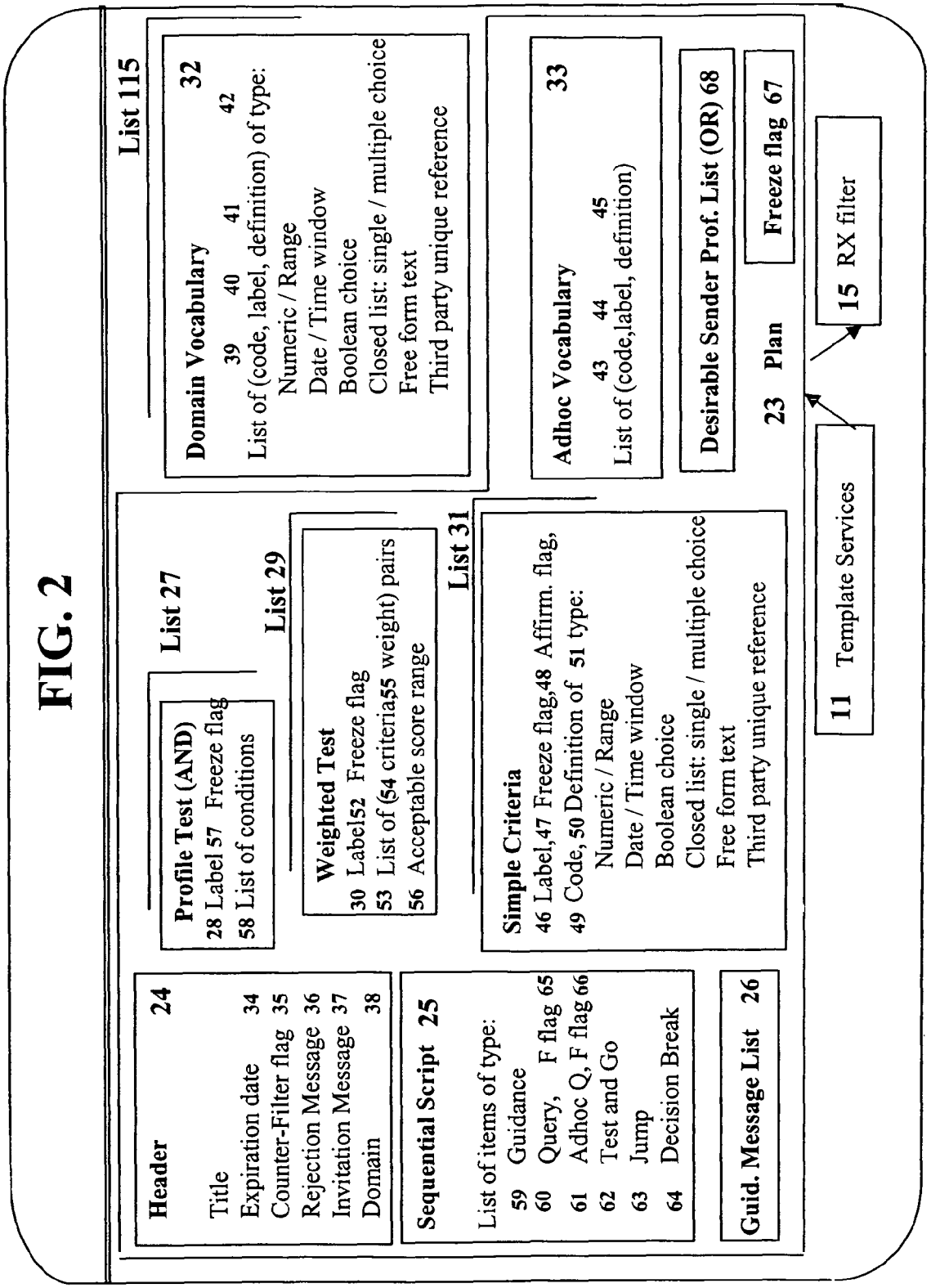
FIG. 2 details an embodiment of the data structure of a filter as built by a receiver to determine whether a sender may send an email to said receiver.
Figure 3A:
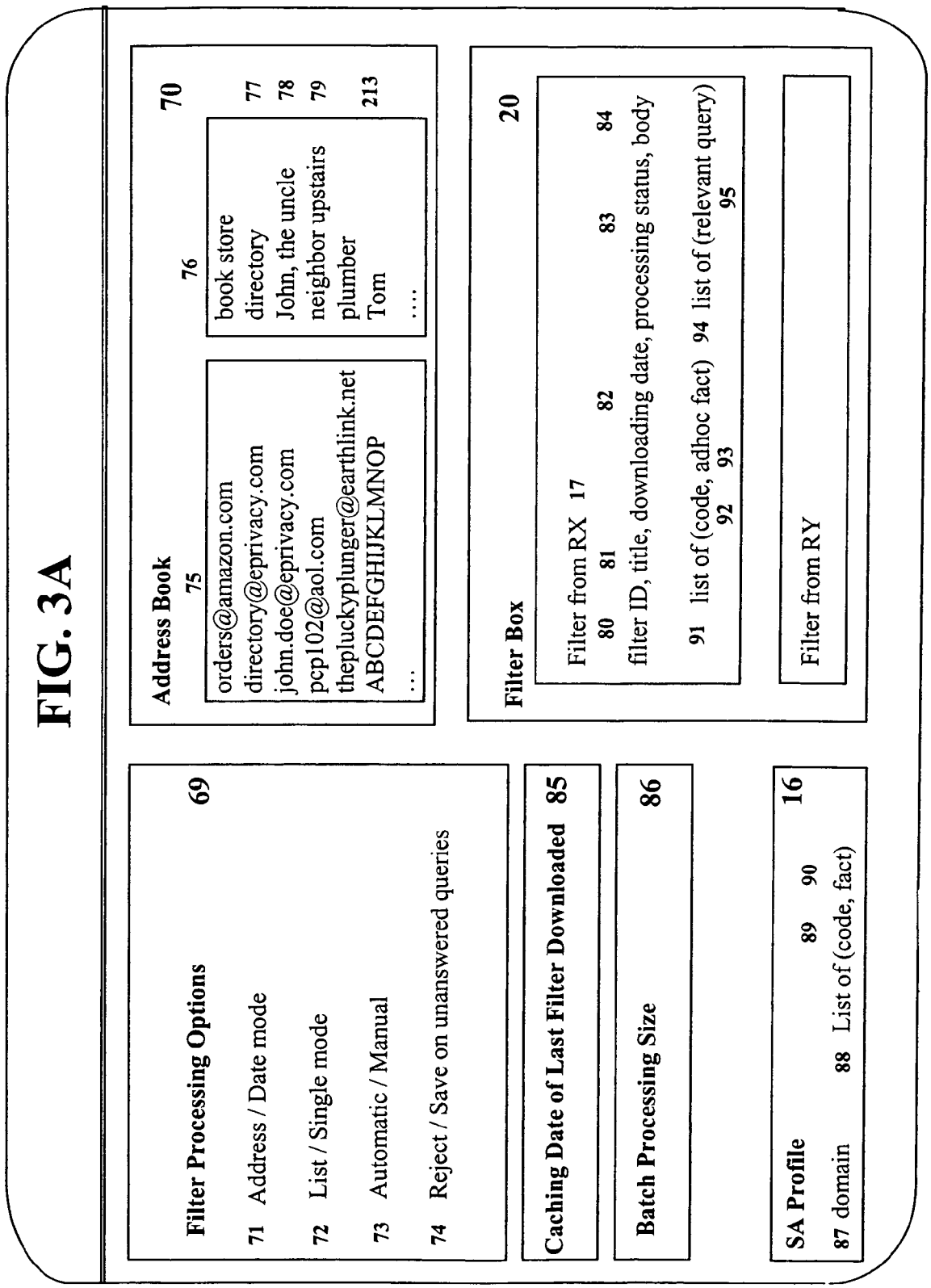
FIG. 3A details an embodiment of the data structures used by a sender to seek authorization to send an email to a receiver.
Figure 3B:
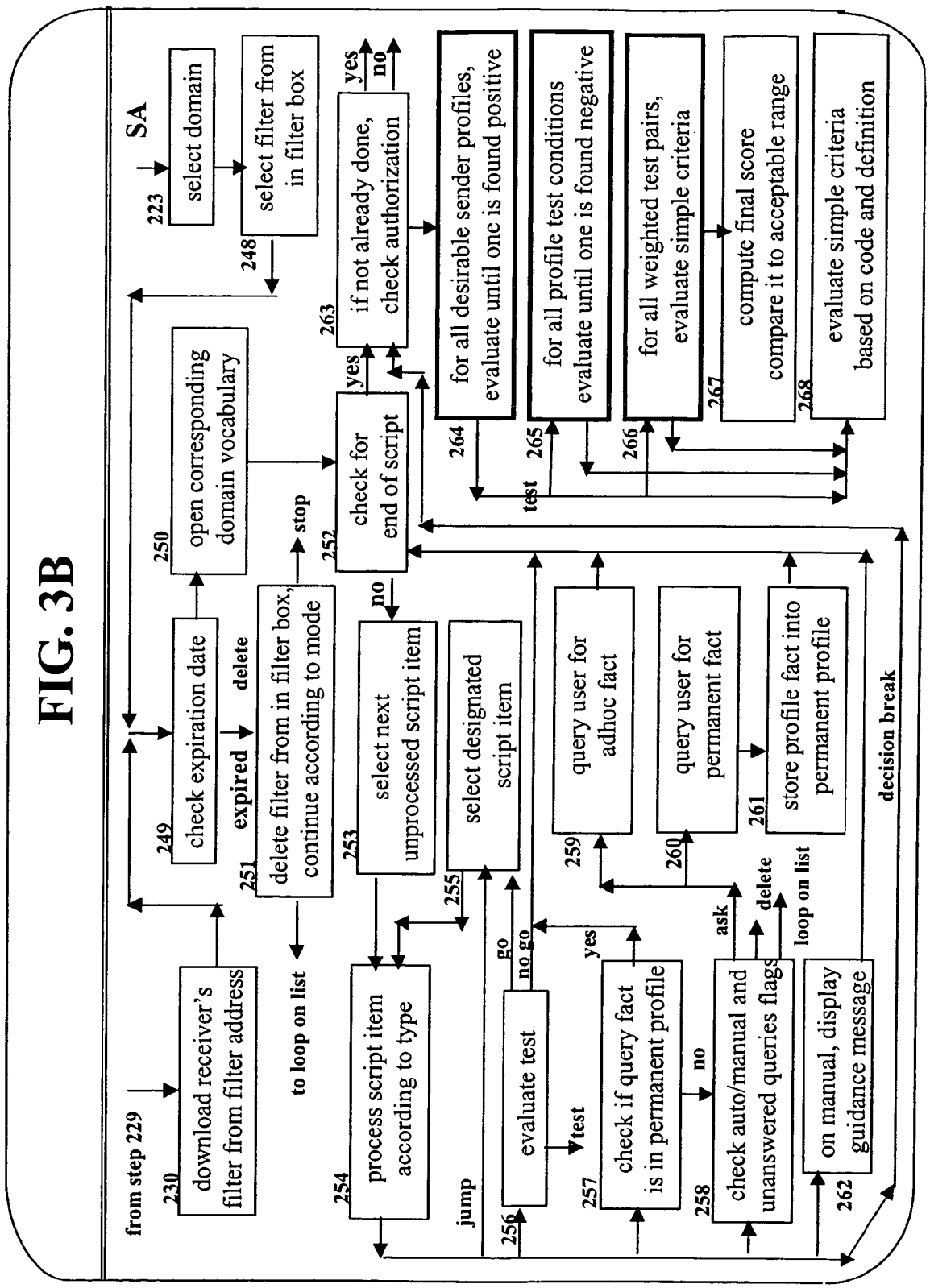
FIG. 3B is an embodiment of a flow chart to accompany FIG. 2 and FIG. 3A.

Referring now to FIGS. 2, 1B, and 3B, shown are the major data structures manipulated by filter editing application 6 to manage filter 15. Plan 23 is the basic structure, which can be prepared from scratch or from a template downloaded from template services 11. When receiver (RX) 2 is satisfied, filter editing application 6 compiles and encrypts plan 23 into RX filter 15 in a way suitable for downloading by sender 1 as filter from RX 17, whether directly or through filter caching services 13 (see step 238). Receiver 2 can store plan 23 (see step 241) for later selection (see step 239) and update (see step 240) to recompile it into RX filter 15 as often as desirable (see step 238). If receiver 2 uses caching services 13, receiver 2 can further at will upload RX filter 15 to and delete it from, caching services 13 (see step 242).

Plan 23 comprises a header 24. Header 24 comprises an expiration date 34 so that filter from RX 17, copy of filter 15, will be purged from filter box 20 by filter inbox application 8 if execution is attempted after date 34 (see steps 249, 251). While receiver 2 cannot update filter from RX 17, setting expiration date 34 for example one month hence, sets a limit for accepting the results of out of date filter copies. Header 24 further comprises counter-filter flag 35. When flag 35 is off, filter inbox application 8 will not give permission to message editing application 9 to send a message. For example, template services 11 offers its template as a neutral state filter with flag 35 off so that sender (SA) 1 can download and process it to populate SA profile 16 without triggering message editing application 9. Header 24 further comprises two messages, 36 in case of rejection, 37 in case of acceptance, of sender 1 by filter from RX 17. Assuming third party service 11 includes conditions to check SA profile 16 for inconsistencies, for example if sender has declared: "age=14" and "driving license status=valid in the US", filter inbox application 8 can make use of messages 36 and 37 to relay some general conclusion to sender 1, such as "profile inconsistent/consistent". Header 24 further comprises a domain 38 that allows plan 23 to incorporate a domain vocabulary 32 by reference (see step 250).

Domain vocabulary 32 and adhoc vocabulary 33 are lists of codes suitable for helping receiver 2 check the desirability of receiving an email from sender 1. Adhoc vocabulary 33 gives receiver 2 unlimited freedom to query sender 1 during execution of filter inbox application 8. With this benefit come two potential drawbacks: the size and complexity of filter 15 grow accordingly and sender 1 can no longer rely on answers provided in advance within SA profile 16, which does not store adhoc facts. Assuming sender 1 and receiver 2 share the domain vocabulary 32, for example packaged with applications 6 and 8 or offered for download by template services 11, filter 15 can be much smaller and, in the absence of adhoc queries, its execution may become automatic. Domain vocabulary 32 is a list of items comprising a unique code 39, a label 40 and a definition 41, itself comprising a type 42 and a number of parameters dependent on type 42. Filter editing application 6 uses code 39 internally to identify each vocabulary item and label 40 externally in its user interface. An embodiment of the present invention comprises the following vocabulary types: numerical value and range, date and time window, Boolean choice, closed list with single or multiple choice, free form text and third-party defined unique reference. The software engineer skilled in the art may freely add to or subtract from, this list. Practical consideration should be given to interface dependencies so that different versions of domain vocabulary 32 can be derived for different languages, allowing copy Filter from RX 17 of filter 15 to be processed by sender 1 in sender 1's language even if different from receiver 2's. For example parameters for a closed list type are the number of entries, followed by the entry labels in some arbitrary, fixed order. Plan 23 will use this order to numerically encode any reference to specific user choices while presenting the entries to the user as labels alphabetically ordered in the language at hand. Adhoc vocabulary 33 is similarly a list of items comprising a code 43, a label 44 and a definition 45, definition 45 respecting the conventions adopted for definition 41. Since adhoc vocabulary 33 is part of plan 23, it will be presented to sender 1 in the language of receiver 2. As an example of a domain, one can take sports. As examples of vocabulary items one can mentioned the following closed lists, a list of "sports in which self is involved" with definition parameters: American football, baseball, bicycle riding, tennis ..., a list of "sports-related activities by self": amateur, equipment manufacturer, fan, professional, sponsor, writer ..., a list of "brands represented by self": Asics, Adidas, Nike, Trek Bicycle ..., a list of "sports related organizations to whom self belongs": NBA, NFL, US Olympic Committee ..., a list of "sports stars who self is": Lance Armstrong, Michael Jordan, Pete Sampras ... each list actually closed, including the choice "other" or the choice "none" when meaningful, the last list given in the example being single choice. For later references, we will associate code value 4321 to the user friendly label "sports in which you are involved". The software engineer skilled in the art may further provide different embodiments for displaying vocabulary lists 32 and 33 more efficiently. For example one may allow entries whose labels 40 or 44 are closely related to be regrouped into pages, summarized or expanded at user's request.

Vocabularies 32 and 33 enable receiver 2 to specify a list 31 of simple criteria to be evaluated during execution of plan 23 by filter inbox application 8 on the actual values provided by sender 1. Each list 31 item comprises a unique label 46, a freeze flag 47, an affirmative flag 48, a code 49 and a definition 50, itself comprising a type 51 and a number of parameters dependent on type 51. Filter editing application 6 uses label 46 to identify each criteria. Code 49 refers to an existing vocabulary code 39 or 43 as the case may be and specifies the fact on which bears label 46. An embodiment of the present invention comprises the following criteria types: numerical value and range, date and time window, Boolean choice, closed list with single or multiple choice, free form text and special codes delivered by third parties for unique references. For each criteria type 51 and each vocabulary type 42, some natural matching method is provided (see step 268). For example a free form text criteria matches a free form text value when the two text strings are identical, a range criteria matches a numeric value when this value falls in that range, a multiple choice closed list criteria matches a multiple choice closed list value when the two lists of choices share at least one member, a range criteria never matches a Boolean criteria .... Using the previous vocabulary example, a receiver who is a sports fan can check whether the sender is involved in bicycle riding or tennis (with simple criteria code value 4321 and definition parameters "bicycle riding or tennis"), or whether the sender is sports star Lance Armstrong or Pete Sampras, making it possible for promotional messages sponsored and sent by Lance Armstrong or Pete Sampras to reach this receiver while excluding those from Michael Jordan. The software engineer skilled in the art may freely add to or subtract from, the simple criteria types and the matching methods mentioned above. Practical consideration should be given to aligning criteria types 51 and vocabulary types 42 used in definitions 41 and 45. For example one can forbid a numerical type 51 to reference a code 39 of a date type 42. As another example one can force a closed list type 51 referencing a code 39 or 43 of closed list type 42 to admit choices only from the parameters defining the latter. For example if receiver 2 desires to receive mail from a sports star and uses a multiple choice closed list type 51 referencing the previous vocabulary item "sports star who self is", a single choice closed list type 42, he or she has to pick the choices from the list type 42 previously given, which would not presumably include disgraced sports stars convicted of illegal substance abuse. As an example of a more complex embodiment, one can introduce a type 42 "free form text box" and provides that a free form text criteria match a free form text box when the text box value string includes the text criteria string, thus allowing matching based on keyword extraction. When off, affirmative flag 48 indicates that the result of matching criteria 46 with the value of code 39 or 43 referred to by code 49 must be negated. For example with flag 48 off, one can specify that a numeric value fall outside of a certain range or that a list of actual choices do not contain any of a certain list of forbidden choices.

Based on simple criteria from list 31, more complex tests can be constructed by scoring. Instead of directly weighing values provided by a user, as recited in U.S. Pat. No. 6,092,197 and European Patent Application No. 98935494.9, a weighted test comprises a unique label 30, a freeze flag 52 and a list of items 53, each associating a weight 55 to the result of a simple criteria 54 referencing a unique criteria label 46, together with a score range 56. A weighted test matches when the sum of the weights 55 of those items whose criteria 54 matches falls in range 56 (see steps 266-267). Given the previous vocabulary example, one can give a weight of 10 if sender 1 happens to be sports star Lance Armstrong, 6 if his or her activities include bicycle riding, 4 if these activities stem from equipment manufacturing, 2 if from amateur practice and 2 if from writing. With a score range of 9 to 100, receiver 2 will gladly accept mail from Lance Armstrong or from bicycle equipment manufacturers or from bicycle amateurs who write about the sport. Plan 23 comprises a whole list 29 of such weighted tests. Beyond the use of weight tests for profile scoring as ordinarily done in marketing, it is apparent to the mathematician skilled in the art that the basic logical operations AND, OR and XOR can all be implemented via an appropriate set of weights and score ranges while making use of flag 48 to implement NOT. Beyond simple and weighted tests, plan 23 further comprises a whole list 27 of profile tests. Each profile test comprises a unique profile label 28, a freeze flag 57 and a list of conditions 58, each list item referencing either a weighted test 30 or a simple criterion 46 by label. A profile test matches when each of the conditions in list 58 matches (see step 265). Assuming a vocabulary item corresponding to "reasons for sending mail": getting in touch, telling anecdotes, giving training advice, pitching a product . . . , a receiver interested in bicycle riding can set a profile test by asking sender 1 to pass the weighted test presented above and the simple criteria, based on a multiple choice closed list, of wanting to tell anecdotes or give training advice. Plan 23 further comprises list 68 of desirable sender profiles, each element of the list being either a profile test 28, a weighted test 30, or a simple criteria 46. Sender 1 will receive authorization from receiver 2 according to plan 23 as compiled into filter 15 if and only if sender 1 satisfies at least one item of list 68 (see step 264). Sender 1 does not receive authorization from receiver 2 according to plan 23 as compiled into filter 15 when sender 1 does not satisfy at least one item of list 68. Assuming for example that receiver 2 is interested in bicycle riding while in regular contact with a number of government agencies and of well known commercial institutions, receiver 2 might want to define list 68 as three separate profile tests 28 corresponding to his or her main categories of correspondents. The first category refers to pre-identified administrations, the second to pre-identified companies or brands, and the third open the door to either pre-identified stars addressing their fans or otherwise unknown individuals eager to share their knowledge of bicycling riding. While the tiered structure of condition lists 68, 27, 29 and 31 recited in this embodiment both expresses any logical expression and remains user-friendly to a wide public, many variations can be made by the software engineer known in the art while embodying the characteristics of the present invention.

While list 68 expresses how filter inbox application 8 will exploit the confidential information provided by sender (SA) 1 or stored in SA profile 16, plan 23 further comprises sequential script 25 (see steps 253-254) and guidance message list 26 to manage the discovery of this information. Assuming for safety that no data about sender 1 is available to environment 4, script 25 comprises appropriate queries 60 (see step 260), each a reference to a vocabulary item identified by code 39, and adhoc queries 61 (see step 259), each a reference to an adhoc vocabulary item identified by code 43. For example a script can ask the sender: "sports in which you are involved" with query value 4321. To make the task of sender 1 easier, care should be taken to make the order in which the queries are made most meaningful. Yet in general only a fraction of queries 60 and 61 will themselves be meaningful: for example if receiver 2 both expects mail from the IRS and wishes to receive advice from Lance Armstrong, script 25 may contain a query on which government agency and one on which sports star is sender 1. Consequently script 25 further comprises flow control items such as test and go 62 (IF . . . THEN) and jump (GOTO) 63, used to present sender 1 only with the queries relevant to his or her case, and guidance items 59 for comments. The software engineer skilled in the art will recognize that this provides plan 23 with a general scripting ability and that other scripting mechanisms can be substituted to make other embodiments. Guidance item 59 refers to an adhoc message list 26 (step 262). Test 62 refers to an item in test lists 27, 29 and 31. Both test 62 (see step 256) and jump 63 (see step jump—255) refer to the item of script 25 at which the execution flow will resume respectively if the test succeeds and after the jump. Following script 25 is akin to filling a form or a marketing questionnaire with instructions such as "if you have answered 'yes' to the previous question, skip to question 59". It is important to notice however that consistency tests can also be inserted in script 25 using appropriate test and go 62 leading to specific error messages 59 such as "you are too young to have a valid US driving license, please review your profile", based on a previous example. Script 25 thus offers dynamic guidance to sender 1, more precise than generic conclusion 36 or 37.

When plan 23 is compiled into filter 15, filter editing application 6 checks script 25 for correctness and completeness, for example flagging any test 62 which references a code whose value has yet to be queried per query 60 or 61 or, for another example, any simple criteria 46 which references a code not queried at all in script 25. Assuming the script has passed this check, the labels 28, 30 and 46, used solely for cross-referencing, are eliminated and references to them replaced with numerics. Assuming simple criteria in list 31 of closed list type 51 cannot refer outside of definition 41 or 45 of the vocabulary item corresponding to code 49, all such references are also encoded numerically. When no adhoc vocabulary is used, filter 15 thus becomes a very dense and powerful expression of what receiver 2 deems desirable correspondents. Ease of use will benefit from a third party service 11 to build, test and offer ready made templates to receiver 2. To prevent receiver 2 from altering critical parts of a template by mistake, plan 23 further comprises a freeze flag 67. When freeze flag 67 is on, filter editing application 6 will deny receiver 2 update capability on header 24, to the exception of title, expiration date 34 and invitation message 37, as well as on script 25, guidance message list 26, adhoc vocabulary 33 and desirable sender profile list 68. The same will be true on a finer scale with freeze flags respectively, 57 pertaining to each profile test 28, 52 to each weighted test 30 and 47 to each simple criteria 46. As freeze flags 57, 52 and 47 can be set independently from one another, freezing can be incremental, allowing a partially frozen template to be frozen further. The software engineer skilled in the art may re-organize the level of detail at which freezing is defined in other embodiments. It is important to note that, while the primary objective is to give receiver 2 a quick and safe way to express his or her wishes, it is also possible to use the freeze flags to express and manage third-party control. For example an operator may distribute the required software packages and make available third party services 11 to 14 to receiver 2 for free but, in exchange, demand receiver 2 welcome commercial email from at least two topics of receiver 2's choice out of some closed list controlled by the operator and enforce the contract by requiring the use of a suitably defined partially frozen template. In another example, a parent may add more restrictions to the filter template he or she has downloaded for a child before letting the child use an email account. In a third example, the need for both increased user productivity and internal policy enforcement can lead a company to run its own template services 11 for its own employees. It is a characteristic of this invention that, when freeze flags are off, receiver 2 retains complete control of his or her filter. Freeze flags 67, 57, 52 and 47 are eliminated at compilation time.

Plan 23 further comprises feedback flags 65 and 66, attached within script 25 to each query 60 and each adhoc query 61 respectively. For each flag 65 and 66 turned on, sender 1 will be requested to feed the corresponding fact value back to receiver 2. For example one can turn flag 65 on to facts corresponding to contact information about sender 1: first and last name, address, telephone, well known email address . . . . Since receiver 2 probably does not want this information in the case sender 1 is not desirable and since it is not needed in general for evaluating sender's desirability, script 25 further comprises an optional decision break 64. Script 25 of copy Filter from RX 17 of filter 15 will stop executing at the decision break and evaluation of list 68 will follow to determine whether sender 1 is authorized or not by receiver 2 (see step decision break—263). If sender is indeed authorized, sender 1's message 18 will be sent to mailbox services 14 and sender 1 can come back later to complete execution of script 25 past the decision break. Remember that once all relevant queries have been answered, the privacy capability of environment 4 will prompt sender 1 for an explicit authorization to send the requested feedback information to receiver 2.

Referring now to FIGS. 3A and 3B, shown are the major data structures manipulated by profile editing application 7 to manage SA profile 16 and filter inbox application 8 to download Filter from RX 17, copy of RX filter 15, into filter box 20 and process it, either to gain authorization for message editing application 9 to send a message or simply to populate SA profile 16 to support subsequent automatic processing. Filter inbox application 8 further determines how best to serve sender 1 according to options 69 whose content may vary with the embodiment. In an embodiment of the present invention filter inbox application 8 uses flags 71, 72, 73 and 74.

When flag 71 is on, filter inbox application 8 finds Filter from RX 17 by getting its address, directly or indirectly, from address book 70. When flag 72 is on, filter inbox application 8 will accept more than one filter as a result of a single request for download. For example, sender 1 might want to send the same message to a list of correspondents sharing some generic address provided by third party directory services 12, such as entry 77 directory@eprivacy.com. When flag 73 is on, filter inbox application 8 will operate in automatic mode.

Automatic mode is especially useful when multiple filters downloaded from a single request are expected to bear on some pre-populated profile 16. Since no message is sent until the corresponding filter has been processed and since the number of filters expected may be unbounded, it is not efficient to wait for the downloading of the filters (steps 229-230) before starting to process them (steps 231, 232, 234 in FIG. 1B). Filter inbox application 8 performs its two tasks in alternating batches of a size given by Batch Processing Size 86. Since processing filter from RX 17 is internal to environment 4 while downloading is mostly made of external input/output, the software engineer skilled in the art will recognize that filter inbox application 8 may be speeded up by providing some level of parallel processing between the two tasks. While sender 1 may hope filter inbox application 8 work in automatic mode without interruption, nothing can prevent Filter from RX 17 to make an adhoc query 61 to an adhoc fact 44 or a query 60 to a fact 40 whose value has not yet been entered into SA profile 16. When flags 73 and 74 are on, filter inbox application 8 will purge any such Filter from RX 17 (step 258—delete). For example a catalog-based retailer which wants to address a mailing to its customer list will benefit from letting its customers ask some pre-defined legitimate questions such as "has the catalog changed since the date of my last purchase?", built for example on a query 60 about fact 40 of type 42 date, "date of last catalog update", and on a criteria 46 of type 51 time window, e.g. between "Jun. 23, 2004" and "Sep. 10, 2004", but might want to purge any filter containing an adhoc query 61 such as label 44 of type Boolean "has your CEO, past or present, been accused of accounting fraud in the past 4 years?".

With flag 71 off, filter inbox application 8 asks to download any Filter from RX 17 cached, or in the absence of a caching service compiled, by filter editing application 6 after date 85, as provided by sender 1 and updated after each download to be the caching or compilation date of the most recent filter downloaded so far. For example, sender 1 may want to send a message to some list of generic, unknown targets, as provided by filter caching services 13, and whose ordering may be best effected according to the filter caching date. With flag 72 off, only the first filter corresponding to a request for download by filter inbox application 8 is provided. With flag 73 off, filter inbox application 8 is in manual mode and will not download nor process a target without some explicit action from sender 1 concerning this specific target (step 248). For example, dealing with a neutral state filter as provided by template services 11 to populate SA profile 16 is best done in manual mode since it is highly likely that queries will have to be answered by sender 1. When flag 73 is on and flag 74 is off, rather than purge a filter that cannot be fully processed in automatic mode, filter inbox application 8 simply saves it for future manual processing (step 258—loop on list). For example the PR department of the catalog-based retailer above might want to compose special messages to potential correspondents who ask hard questions but allow a message to be sent to them.

Address book 70 is a table comprising a list of entries such as 77, 78, 79, 213, each entry comprising an address 75 and a comment 76. Sender 1 is free to declare new entries at will and may be provided by a third party directory services 12 with blocks of ready made entries for greater convenience. The software engineer skilled in the art may further provide different embodiments for displaying address book 70. For example one may sort entries by putting their comments in alphabetical order and regroup those sharing the first character into pages summarized or expanded at user's request. When presented with address book 70 by filter inbox application 8, sender 1 simply selects one entry, perhaps after using a keyword search on comment column 76, and filter inbox application 8 uses its corresponding address field from column 75 to obtain Filter from RX 17. In one embodiment, when this address field follows the syntax of traditional email addresses, such as pcp102@aol.com, from entry 79, orders@amazon.com or thepluckyplunger@earthlink.net, filter inbox application 8 sends it to third party directory services 12 which translates it into an appropriate address, forwarded to and recognized by, third party filter caching services 13 or local web servers. When this address field follows the syntax specific to filter caching services 13, such as ABCDEFGHIJKLMNOP in entry 213, filter inbox application 8 sends it directly to filter caching services 13. When this address field follows the syntax specific to direct local filter access at receiver 2's, such as http://www.doefamily.net/filtering/john.html, filter inbox application 8 sends it directly to the local web site of receiver 2. In another embodiment, sender 1 may select several entries from address book 70 at once, for when sender 1 intends to send the same message to several identified receivers. In yet another embodiment directory services 12 may provide more than one translation for a single address field, such as directory@eprivacy.com in entry 77. For example sender 1 may wish to address the same message to the members of a community supported by directory services 12. Since each community member receiver 2 retains the right to grant authorization to sender 1 based on receiver 2's own wishes and each sender 1's profile, directory services 12 will have a wide latitude to bundle filter addresses into lists.

Filter inbox application 8 further manages filter box 20 into which it stores the filters after downloading. Each entry Filter from RX 17 comprises a reference 80 unique to this filter, for example its direct address at filter caching services 13. Entry 17 further comprises a title 81, the date 82 at which it has been downloaded, a processing status 83, the filter body 84, the list of adhoc facts 91 and the list of relevant queries 94. The filter body 84 follows the structure of plan 23 with the exceptions generated by the compilation process, i.e. the replacement of explicit labels 28, 30, 46 by numeric pointers and the elimination of freeze flags 67, 57, 52 and 47. Filter inbox application 8 further processes Filter from RX 17, first interpreting the program represented by script 25 (steps 252-262), second evaluating list 68 as a Boolean expression referencing substructures 27, 29 and 31 in the manner previously recited (steps 263-268). Before starting on script 25, filter inbox application 8 uses reference 38, if present, to fetch the corresponding domain vocabulary 32, sports for example, reporting an error if the latter has not been packaged with filter inbox application 8 itself or previously downloaded by sender 1 from template services 11 (step 250). Subsequently, when filter inbox application 8 encounters a query 60 from script 25, for example query value 4321, filter inbox application 8 first looks to SA profile 16 for the answer (step 257), using the code 39 referenced by query 60. If SA profile 16 does not hold an entry for code 39 and flag 73 is off, filter inbox application 8 in manual mode (step 258) explicitly queries sender 1 for the answer (step 260), using label 40, in the instance "sports in which you are involved"?, and definition 41, in the instance with parameters "American football, baseball, bicycle riding, tennis . . . ", to communicate with sender 1 and code 39, in the instance 4321, to enter the answer in list 88 of SA profile 16 (step 261), with code 89 equal to code 39 and fact 90 as the answer formatted according to definition 41, for example "baseball and bicycle riding". Filter inbox application 8 will act in a similar manner when encountering an adhoc query 61 (steps 258-259) referencing code 43 in the adhoc vocabulary 33, storing the result in list 91. After having processed a query 60 or 61, filter inbox application 8 enters its code into list 94, called relevant query list. In view of script flow controls 62 and 63, some queries 60 or 61 contained in script 25 may not become relevant queries 95. In automatic mode, with flag 73 on, filter inbox application 8 will not stop to ask sender 1 for an unknown fact but proceed according to flag 74 in the manner recited above. Whenever filter inbox application 8 needs to evaluate a simple criteria (step 268) it uses its code 49 to retrieve the corresponding fact value from either SA profile 16 for normal facts or from list 91 for adhoc facts, for example simple criteria of code value 4321 and definition parameters "bicycle riding or tennis" will be matched successfully against fact value "baseball and bicycle riding" given for code 4321 since both definition lists have bicycle riding in common. Boolean evaluation of list 68 (steps 263-264) by filter inbox application 8 is triggered either explicitly, upon executing decision break 64 if script 25 contains one such item (step 254—decision break), or implicitly, at the end of script 25 interpretation (step 252—yes). The software engineer skilled in the art will recognize that different scripting language interpreters and Boolean evaluators may be designed into filter inbox application 8 and constitute as many embodiments of said invention. It is important to ensure that any unforeseen behavior of processing Filter from RX 17, due for example to an infinite loop or an undefined reference in script 25, be trapped and lead to the purging of filter 17 from filter box 20 before authorizing message editing application 9 to send a message to receiver 2. It is also important to allow evaluation of a Boolean expression to terminate as soon as its result is known. For example an OR expression such as list of desirable sender profiles 68 should terminate at the first profile which matches, leading to a positive result (step 264), and an AND expression such as a profile test 28 should terminate at the first condition which fails, leading to a negative result (step 265). The software engineer skilled in the art will recognize that these two measures allow filters to be both more robust and more general relative to some unknown sender 1.

After downloading Filter from RX 17, filter inbox application 8 sets its processing status 83 to "to be processed". If subsequent automatic processing had to be interrupted in view of some unknown fact with flag 73 on and flag 74 off, processing status 83 is changed to "incomplete". When counter-filter flag 35 is off and either conclusion message 36 or 37 has been presented to sender 1 or when counter-filter flag 35 is on and authorization has been given to message editing application 9 on account of filter 17, filter processing status 83 reaches the "completed" stage or is set to "invitation to send facts". The latter occurs when a positive outcome had been reached but script 25 execution had been suspended at decision break 64 or had processed at least one query 95 according to list 94 corresponding to either a query 60 with its flag 65 on or an adhoc query 61 with its flag 66 on. When sender 1 subsequently selects filter 17 from filter box 20 (step 248) with an "invitation to send facts", filter inbox application 8 finishes to present sender 1 with queries past decision break 64, if any, asks sender 1 whether to authorize publication back to receiver 2 of the relevant facts corresponding to queries with raised flags 65 or 66 mentioned in list 94 (see step 283), and finally switches processing status 83 to "completed". In all other cases filter inbox application 8 purges filter 17 automatically as previously recited. Filter inbox application 8, when in manual mode, further lets sender 1 the opportunity to select and delete filter 17 at will from filter box 20.

Whenever it presents a query 60 or 61 or a guidance 59 to sender 1 while processing Filter from RX 17 in manual mode, with flag 73 off, filter inbox application 8 further allows sender 1 the opportunity to review his or her profile. This profile is defined in the context of filter 17 as the answers given so far to queries 60 and 61, whether explicitly or as fetched from SA profile 16, and is recorded as the current state of list 94. Whenever sender 1 asks for a review, filter inbox application 8 passes a reference to filter from RX 17 to profile editing application 7, including reference 38 to domain vocabulary 32 as well as adhoc vocabulary 33. Profile editing application 7 further reports one row per relevant query 95 listed in list 94 of filter 17. When relevant query 95 is a normal query 60, the report uses its reference to a vocabulary item identified by code 39 to retrieve, from list 88 in SA profile 16, fact 90 whose code 89 is equal to code 39. In the instance where a query of code value 4321 has been processed during script execution, the sender will be able to retrieve the fact corresponding to code 4321 labeled "sports in which you are involved" whose value the sender had previously stated to be "baseball and bicycle riding". Similarly when relevant query 95 is an adhoc query 61, the report uses its reference to an adhoc vocabulary item identified by code 43 to retrieve, from list 91 in filter 17, fact 93 whose code 92 is equal to code 43. Profile editing application 7 further interacts with sender 1, to present fact 90 and register its potential update, using label 40 and definition 41 for code 39 equal to code 89, and to present fact 93 and register its potential update, using label 44 and definition 45 for code 43 equal to code 92. For example, if the multiple choice closed list code labeled "sports-related activities by self" has been found relevant, the report may include the list: "fan, writer", which fact may be updated by sender 1 in view of the list of possibilities: amateur, equipment manufacturer, fan, professional, sponsor, writer . . . , to: "fan, professional, writer". Sender 1 can also call profile editing application 7 outside of filter inbox application 8 to report on the entire SA profile 16. Profile editing application 7 behaves in the same manner as when in the context of filter 17 except that, instead of reporting one row per item 95 of list 94, profile editing application 7 reports one row per item 89 of list 88. To interpret codes 89, SA profile further comprises a reference 87 to a domain vocabulary 32, for example sports.

Figure 4:
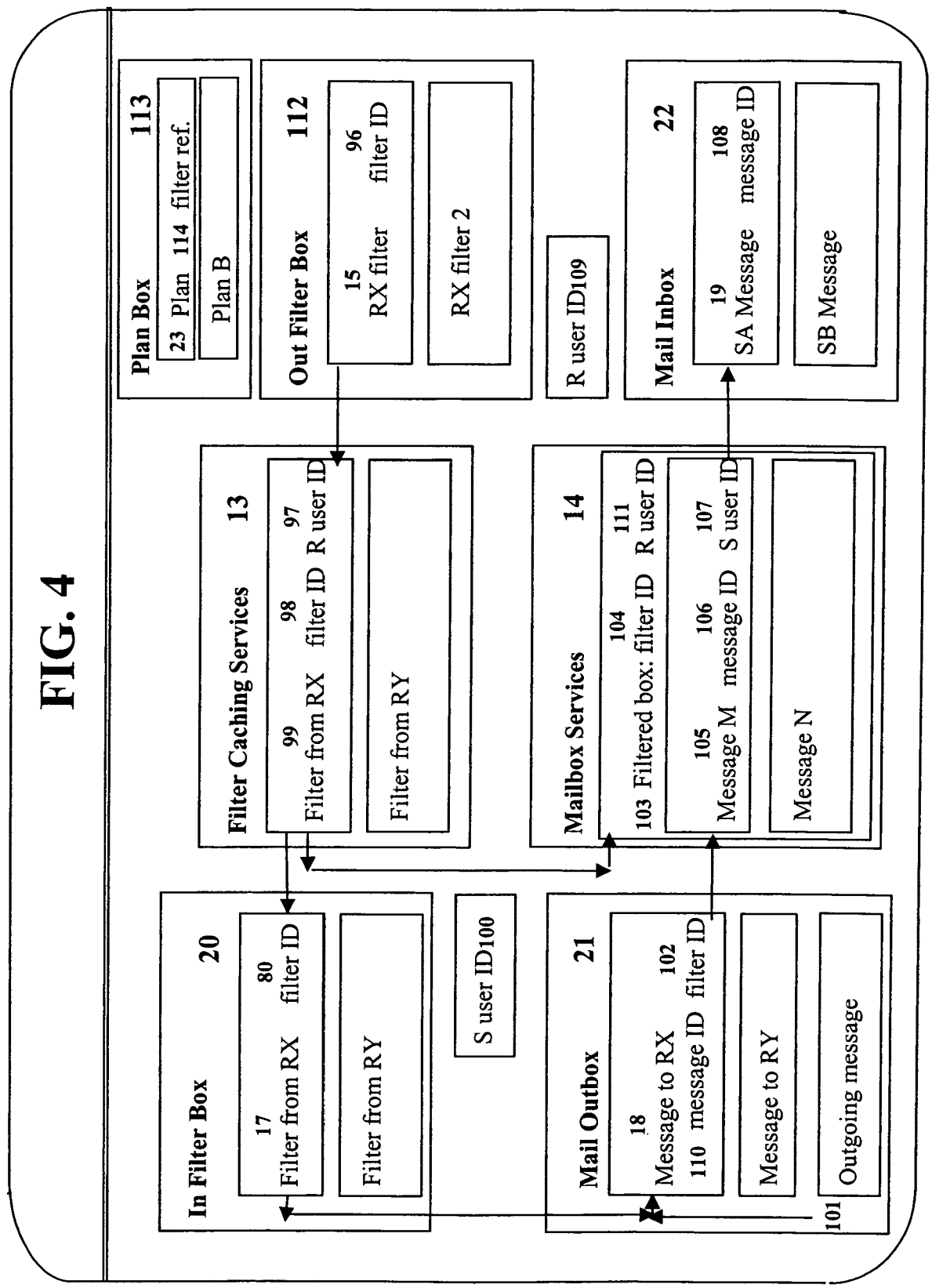
FIG. 4 details an embodiment of the data structures used to convey a message from an authorized sender to the authorizing receiver.

Referring now to FIG. 4, shown are the major data structures used in an embodiment of the current invention for message editing application 9 to help sender 1 edit and send authorized messages, and for mail inbox application 10, to help receiver 2 retrieve them, using third-party mailbox services 14 in cooperation with third-party filter caching services 13. Prior to soliciting a copy of RX filter 15, filter inbox application 8 requests and receives a user ID from caching services 13 and stores it as S user ID 100. Similarly prior to registering a copy of RX filter 15, filter editing application 6 requests and receives a user ID from caching services 13 and stores it as R user ID 109. In response to a request by receiver 2, filter editing application 6 further uploads a copy of RX filter 15, using R user ID 109 to identify itself to caching services 13. Caching services 13 stores the copy of RX filter 15 as Filter from RX 99, further comprising R user ID 97, set to R user ID 109, and filter ID 98, created as a unique identifier ID. Caching services 13 further communicates filter ID 98 back to filter editing application 6, which stores it as filter ID 96. Filter editing application 6 further communicates filter ID 96 to directory services 12 to associate with some well known address for receiver 2 or may rely on caching services 13 to do it on receiver's 2 behalf by providing caching services 13 with the well known address together with the filter. Caching services 13 further sends filter ID 98 together with Filter from RX 99 upon request to filter inbox application 8, which stores it as filter ID 80 of Filter from RX 17. Finally caching services 13 makes filter ID 98 and R user ID 97 known to mailbox services 14, which uses it, if necessary, to create a new special mailbox 103 identified by filter ID 104, set equal to filter ID 98, and R user ID 111, set to R user ID 97. Whenever filter inbox application 8 authorizes message editing application 9 to send a message, message editing application 9 either retrieves outgoing message 101 or solicit sender 1 to edit it if it does not exist yet, and copies it into message to RX 18, which further comprises filter ID 102 to store the value of filter ID 80 communicated by filter inbox application 8 together with the authorization, and message ID 110 to be assigned by mailbox services 14. Message editing application 9 further sends filter ID 102 and S user ID 100 together with message to RX 18 to mailbox services 14. If mailbox services 14 recognizes filter ID 102 as equal to filter ID 104 of some legitimate mailbox 103 previously created upon prompting by caching services 13, mailbox services 14 stores message to RX 18 inside mailbox 103 as message M 105, further comprising S user ID 107, set equal to S user ID 100, and message ID 106, created as a unique identifier. Mailbox services 14 further communicates message ID 106 back to message editing application 9 to store into message ID 110. Finally, when receiver 2 requests mail inbox application 10 to look for mail, mail inbox application 10 calls mailbox services 14 with R user ID 109 and filter ID 96. Mailbox services 14 checks for the existence of a special mailbox 103 with filter ID 104 equal to filter ID 96 and delivers the entries such as message 105 into mail inbox 22 as message 19, further comprising message ID 108 set equal to message ID 106. Once in possession of copy 19 of message 105, receiver 2 may ask at will mail inbox application 10 to delete it from mailbox 22, which further triggers an order by mail inbox application 10 to mailbox services 14 to delete message M 105 whose identifier message ID 106 is equal to message ID 108. For example a sports-related filter might initially be given filter ID DCBA from caching services 13. This unique value DCBA will then be propagated throughout the whole system as the value shared by filter ID's 98, 96, 104, 80 upon request, and finally 102 assuming proper authorization. Similar value propagation chains can be followed for the receiver's ID, from 109 to 97 to 111, the original content of a filter, from 15 to 99 to 17, the sender's ID, from 100 to 107, the original content of a message, from 101 to 18 to 105 to 19, and the message ID, from 106 to 110 to 108. One will notice that during transmission a sender's message is always associated with its sender, the filter which authorized its transmission and the receiver who approved this filter, allowing precise forensic investigations while keeping the receiver's ID from reaching the sender, the sender's ID from reaching the receiver and the sender's profile from unauthorized disclosure. In another embodiment, the software engineer skilled in the art may allow receiver 2 to manage mail delivery by mailbox services 14 so that remote message 105 be deleted upon local delivery as message 19 or kept even after deletion of local message 19. In another embodiment, with no third party filter caching services 13 and mail box services 14 involved, unique filter ID 96 is generated locally by filter editing application 6 and contains the address at which to reach a local web application with direct access to mailbox 22. Assuming that sender 1 has been told the address of a local web application with direct access to RX Filter 15, message editing application 9 will extract where to send Message to RX 18 from filter ID 102, obtained from filter ID 96 via filter ID 80 as collected by filter inbox application 8 upon filter download. When message editing application 9 presents Message to RX 18 together with filter ID 102 at this address, filter ID 102 is compared to filter ID 96 and, if identical, Message to RX 18 is recorded as SA Message 19. In yet another embodiment, still without third parties 13 and 14, unique filter ID 96 is generated locally by filter editing application 6 not at compilation time, but for each download request by sender 1, so that any further test of the validity of the exchange may bear on the sender as well as on the filter, as it can when Mailbox services receives S user ID 100.

In another embodiment of the present invention and referring again to FIG. 4, it can be seen that S User ID 100 is a fact attached to sender 1. By convention some arbitrary code 39, for example code number 0, can be made to correspond to S User ID 100, using label 40 "user registration" and type 42 "third-party defined unique reference", as previously mentioned. S User ID 100 thus becomes just another entry inside SA profile 16 and, with the additional convention that profile editing application 7 cannot update this code, remains a genuine ID. Referring back to FIG. 3A, it can be seen the same hold in principle for address book 70. To enable address book 70 to be dealt with as a fact for some other arbitrary code 39, for example code 1, it is necessary however to create a special vocabulary type 42, i.e. "address book". A fact of type "address book" is simply recorded as a two dimensional string array. In this embodiment, corresponding simple criteria and matching methods can be defined to take advantage of the full filtering mechanism. Definition 50 for simple criteria 46 of type 51 "third party unique reference" comprises the value encoding type 51 "third party unique reference" followed by the value of the unique reference itself. Definition 50 for simple criteria 46 of type 51 "address book" comprises the value encoding type 51 "address book" followed by some subset of column 75 selected from the corresponding address book. Matching is defined for all four combinations. A "third party unique reference" criterion matches a "third party unique reference" fact when the two unique references are equal and matches an "address book" fact when the unique reference defining the criteria equals an entry in column 75 defining the fact. An "address book" criteria matches a "third party unique reference" fact when its definition holds an entry equal to the value of the fact and matches an "address book" fact when its definition holds an entry equals to an entry in column 75 defining the fact.

In yet another embodiment of the present invention, it might be useful for receiver 2 to manage more than one filter RX filter 15. For example, receiver 2 may prefer to break an all encompassing plan into several smaller plans for greater modularity. In another example receiver 2 may want to experiment with different versions of a base plan to find out which one works the best, in which case only one RX filter 15 will be made available at any time. Referring again to FIG. 4, filter editing application 6 has access to Out Filter box 112 in which it can store a plurality of filters such as RX filter 15 and to Plan Box 113 in which it can store a plurality of plans such as plan 23. Plan 23 comprises further a reference 114 to the filter, if any, into which it has been compiled. Mail inbox 22 may be further structured according to the filter responsible for having authorized each message (step 243), leading receiver 2 to specify which filter-specific mail inbox to use to retrieve emails (step 245 and step 294). In one embodiment directory services 12 maintains a list of the filter ID's corresponding to the well known address provided by receiver 2 and translates this well known address as it would a generic address, such as the one in entry 77. Depending on the embodiment, a filter request from filter inbox application 8 may be answered with one filter RX filter 15 only or with the filters contained in Out Filter box 112 according to flag 72 as set by sender 1. A special application of this feature is to allow receiver 2 to set up an unconditional filter which receiver 2 uploads to filter caching services 13 but does not include as a translation from receiver 2's well known address accessible from directory services 12. Receiver 2 may then use the corresponding filter ID 96 as a confidential address to give to sender 1, assumedly trusted by receiver 2, which sender 1 proceeds to enter into address book 70 along the model of entry 213. Obviously receiver 2 needs to set up another, more complex filter for untrusted senders.

As mentioned earlier, one embodiment according to the invention involves bundling together the applications 6, 7, 8, 9, and 10 into a confidential sending/receiving agent. In this case, R user ID 109 is redundant with S user ID 100 for a given sender/receiver and both can be recorded as a single fact, at code 0 for example, in profile 16. As can be seen from FIGS. 1A to 4, there is no other structure conflict. In the sequel, both sender 1 and receiver 2 are assumed to have the benefit of a dual role environment. If a reference to a structure previously recited would otherwise be ambiguous, it will be further qualified by either environment 4 or 5 or label SA or RX, specific respectively to sender 1 and receiver 2. One advantage for receiver 2 is the further ability to record another address book, using yet another fixed arbitrary code 39, for example code 2 reserved for "trusted sender book", in RX profile 16. In this address book, receiver 2 may enter the unique user ID of trusted senders, such as his or her close family members, as communicated by them to receiver 2. When a simple criteria 46 of type 51 "address book" is created by receiver 2 with code 49 equal to 0, i.e. to be matched against the third party unique reference of a remote user, sender 1's S user ID 100 in the instance, RX filter editing application 6 further makes the local user, receiver 2 in the instance, specify the address book, the one recorded in RX profile 16 as the fact of code 89 equal to 2 in the instance, from whose column 75 the parameters of definition 50 are to be taken. In evaluating this criteria, SA filter inbox application 8 verifies whether sender 1 is among the trusted renders recognized by receiver 2. It is important to notice the difference between the two approaches available to receiver 2 to recognize known senders. With the address book of trusted senders, receiver 2 allows indefinite access to members of a list that is likely to remain small as it needs be inserted into a filter to be useful. By giving a direct address to an unconditional filter, there is no limit to the number of correspondents to whom receiver 2 may grant access, but this access may be terminated by receiver 2 at short notice, for example as soon as too many undesirable correspondents get to learn the confidential address of the filter, which is bound to happen, leading receiver 2 to delete the filter and replace it with another one, maybe identical in content but with a new filter ID 96.

In yet another embodiment of the present invention, it might be useful for all, i.e. receiver 2, sender 1 and third party services if any, to manage a plurality of domain vocabularies. For example receiver 2 might wish to segregate his or mail into broad categories of interest, taking advantage of a plurality of filters as a way to dispatch incoming mail even as it is sent. In another example sender 1 may want to segregate his or her address book according to the purpose of the relationship: friends and family, fellow hobbyists, household management .... Or sender 1 might be a professional information service provider and would like to segment activities according to prospect expectations to be more efficient. In yet another example, third party directory services 12 may want to set up specialized topic lists in the manner of yellow pages or to facilitate direct marketing. Referring now back to FIGS. 2, 3B, and 1B, shown is a list of domain vocabularies 115 of which domain vocabulary 32 is an entry. Assuming that sender 1 and receiver 2 pick a vocabulary 32 out of list 115 each time they call applications 6 to 10 (steps 223, 235) and that Template Services 11, Directory Services 12, Filter Caching services 13 and Mailbox Services 14 are given this reference as a parameter by applications 6, 8, 9 and 10 each time an application calls a service, it is readily apparent to the software engineer skilled in the art that the previous description of the present invention carries over by making the structures of FIG. 4, i.e. Out Filter Box 112, Filter Caching Services 13, In filter Box 20, Mail Outbox 21, Mailbox Services 14 and Mail Inbox 22 dependent on the reference 32 picked out of list 115. The only structures which actually make use of the internal details of vocabulary 32, plan 23 and RX filter 15, and its copy filter from RX 17, as well as SA profile 16 and by extension RX profile 16, already contain a reference to vocabulary 32, respectively domain 38 for plans and filters (see step 250) and 87 for profiles (see steps 223, 226). In particular the address books previously mentioned in relation to code 1 and code 2 respectively of domain vocabulary 32 are specific to one domain vocabulary. One special provision needs be made for mail inbox application 10. When receiver 2 wishes to read his or her mail, receiver 2 picks a vocabulary 32 out of list 115 before calling mail inbox application 10 (step 235), but when receiver 2 only wants to get his or her mail, receiver 2 may call mail inbox application 10 without specifying a vocabulary, thus instructing mail inbox application 10 to loop automatically over all vocabularies listed in list 115 (step 247).

A balance can be struck between flexibility, allowing for a plurality of third party service providers and for a plurality of domain vocabularies, and efficiency, making sure that email service does not become fragmented into incompatible islands. The first provision is to provide for a universal registration method so that no two users, nor two filters may receive the same ID from a third party, for example by requiring that third parties themselves ask for a unique identifier from a common organization. The second provision is to require that all directory services provide a seamless translation of well known names into filter addresses, following for example the DNS system of the Internet. The third provision is to establish a common authority responsible for common vocabularies sharable by all users, the most basic being prepackaged with all sending/receiving agents. In this ways users can count on sharing at least one vocabulary while unlimited freedom is available to create vocabularies and associated templates for all kinds of usage, public and private.

While the invention detailed so far allows a receiver to select who, whether known or unknown, is authorized to send him or her an email, and hence eliminates undesirable mail, undesirability in this context only represents the receiver's opinion. When email is used by a sender unknown to a receiver, it is highly likely that the receiver is also mostly unknown to the sender. For a salesman for example, knowing the address of an interested prospect is not the same as knowing whether the prospect is worth the effort that goes into a sale. For a sender of information deemed suitable for adult readers only, it can indeed be vital to eliminate receivers whose age is below 18 in order to comply with the law or simply in view of good business sense. This is especially true when special business models are considered. For example sender 1 may be an independent author eager to send copyrighted information directly to anyone willing to pay at least some minimum fee to the author. Such an author cannot rely on receiver 2, assuming receiver 2 is interested by the information, to check on pricing within filter 15. As another example, an automobile manufacturer might be willing to extend some consideration, such as a free trial or some monetary incentive, to prospects interested by a new car model but would want to restrict this message to a select group of early influencers characterized by specific profile features, with due respect to relevant antidiscriminatory laws. In a third example, directory services 12 may want to avoid mandatory unicity for well known addresses: rather than refusing a well known address such as the one in column 75 of entry 78 because there is another John Doe already registered under that name and taking john.doe-123 instead, why not listing another john.doe as telephone directories do, with the provision that sender 1 will be given the means to eliminate all receivers but Uncle John even if some other John Doe is ready to accept mail from sender 1 in the first place. It is a further goal of this invention to let sender 1 verify whether receiver 2 is indeed a desirable target for his or her message.

Figure 5A:
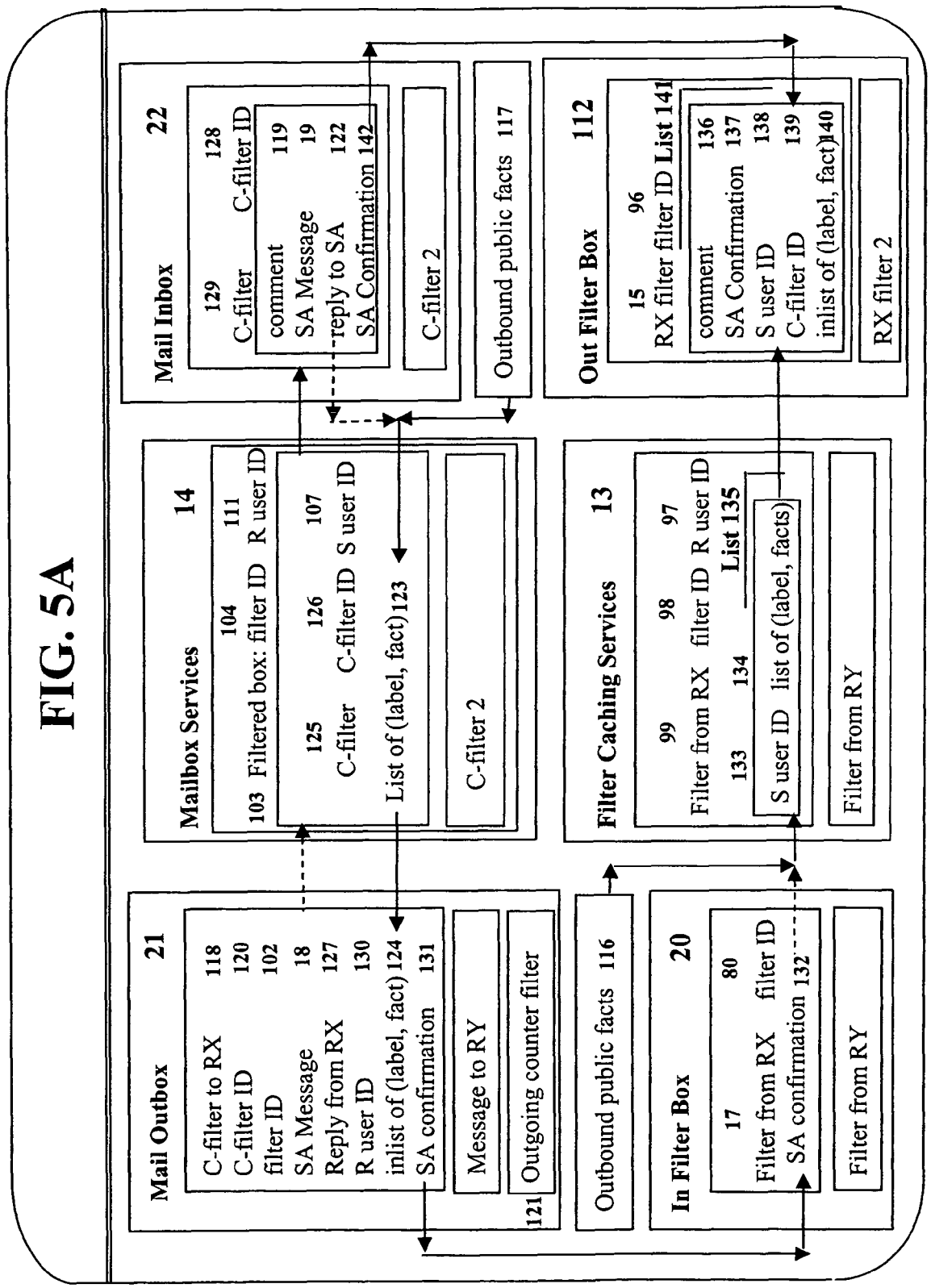
FIG. 5A details the special data structures of the system according to one embodiment of the present invention for eliminating unwanted targets of spam-free email.
Figure 5B:
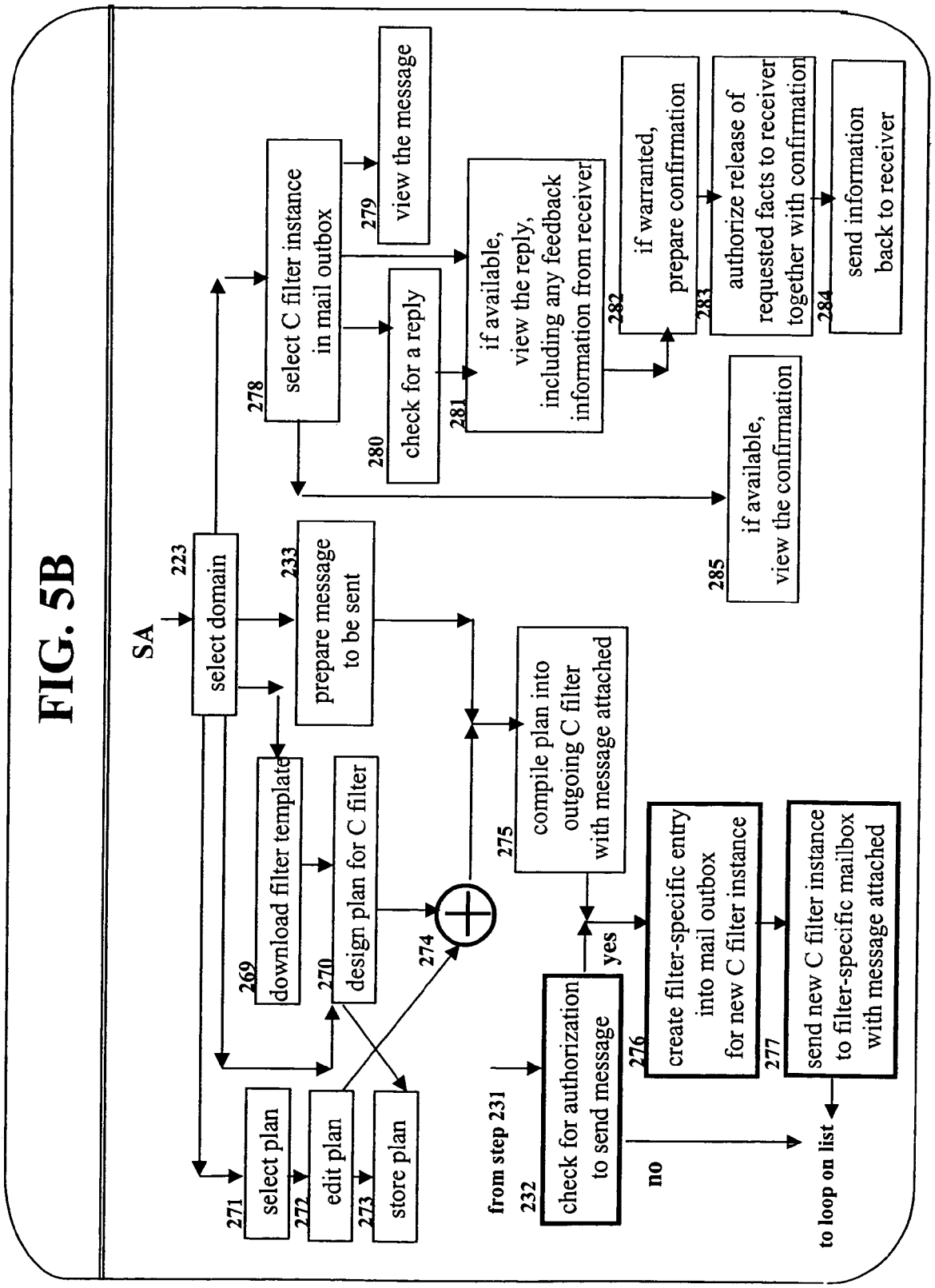
FIGS. 5B and 5C are embodiments of a flow chart to accompany FIG. 5A.
Figure 5C:
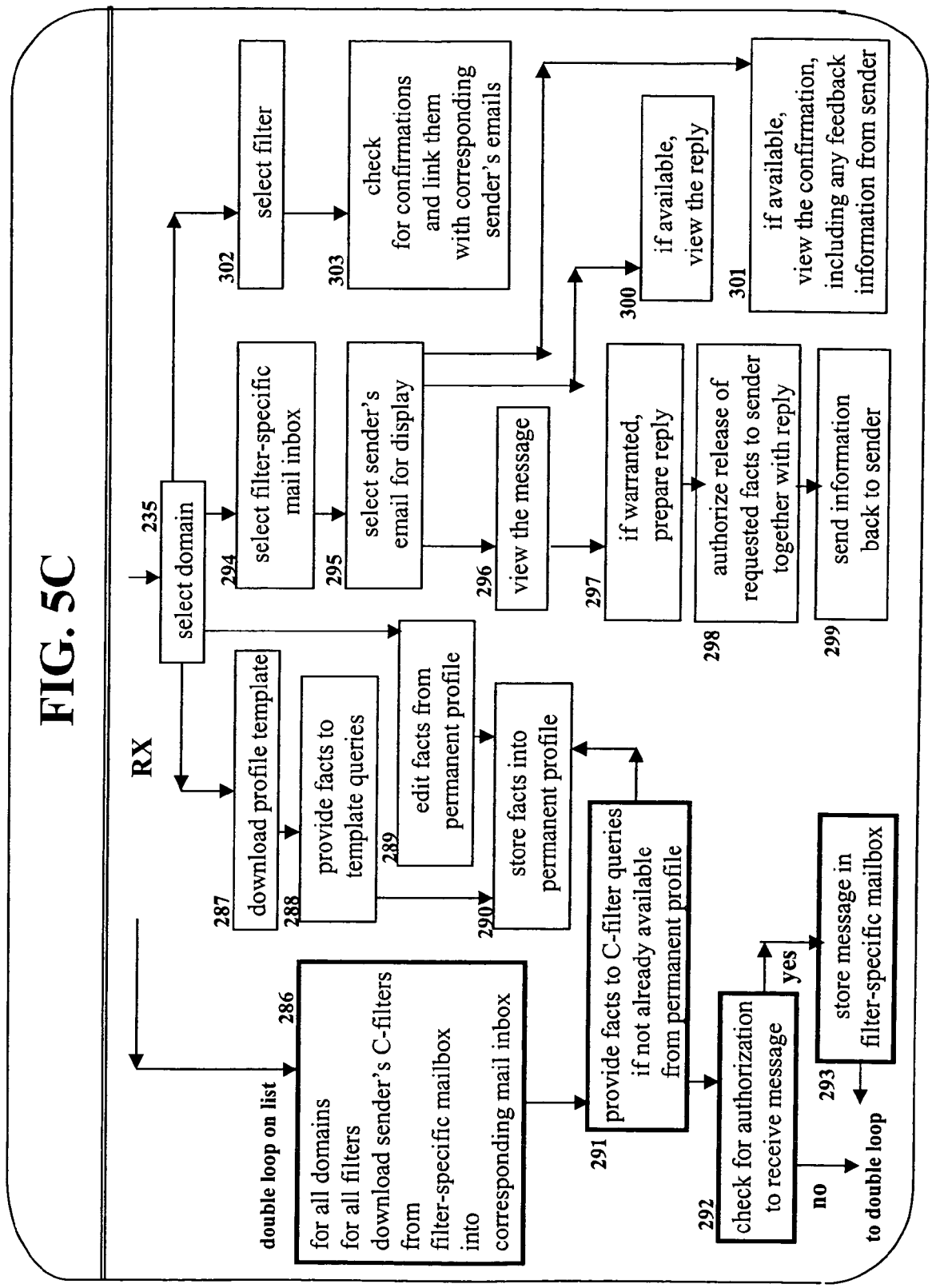

Referring now to FIGS. 5A, 5B, and 5C, shown are the special data structures of the system according to one embodiment of the present invention for eliminating unwanted targets of spam-free email. Not shown are the two confidential, personalized, interactive environments, complete with the five applications 6 to 10, one for sender 1 SA, the other for receiver 2 RX and the specification by sender 1 and receiver 2 of some common domain vocabulary 32 to which applications 6 to 10 refer on both sides (steps 223, 235). This embodiment is further described as one modification and further additions to the description previously given. The modification is as follows. Whereas, going back to FIG. 4, sender 1 would previously prepare outgoing message 101 for SA message editing application 9 to turn, upon authorization from SA filter inbox application 8, into message to RX 18, sender 1 now uses SA filter editing application 6 to prepare outgoing counter filter (C-filter for short) 121 for SA message editing application 9 to turn, upon authorization from SA filter inbox application 8, into C-filter for RX 118 (steps 269-276). A C-filter is identical to a normal filter except for its being used in response to a filter such as Filter from RX 17 rather than on a stand alone basis. In particular a C-filter is built according to the description previously given referring to FIG. 2 and associated with a plan 23 stored in the plan box 113 of the environment concerned, SA environment 4 in the instance. While steps 269-270 mirror steps 236-237 and steps 271-273 mirror steps 239-241, step 274 formally indicates that the plan input to the compilation step 275 comes from either an original design (step 270) or an update (step 272). Going back to FIG. 2, when plan 23 is used for preparing C-filter 121 rather than RX filter 15, first, counter-filter flag 35 is normally turned off to prevent receiver 2 RX from responding to the C-filter from sender 1 SA with a C-filter of his or her own, second, invitation message 37 holds what used to be outgoing message 101 and third, domain 38 refers to domain vocabulary 32 specified by sender 1 when calling SA filter editing application 6. Sender 1 completes the preparation by compiling plan 23 into C-filter 121 (step 275). Assuming that domain vocabulary 32 covers the potential wishes of sender 1 as well as of receiver 2, sender 1 has as much power to interact with and select, desirable target receivers as receiver 2 to interact with and select, desirable potential senders. Since C-filters are similar to normal filters, the role of template services 11 carries over to C-filters: sender 1 can download a template instead of designing a plan from scratch to make a C-filter (step 269) and receiver 2 can use RX filter inbox application 8 to download the same template as a neutral filter to populate RX profile 16 to further automation of RX mail inbox application 10 (steps 287-290). For example, sender 1 could specify that "acceptable price for emailed copyrighted information" for receiver 2 be greater than US$5, e.g. not in the range [0, 5] US dollars according to a simple criteria of type 51 range. As another example, sender 1 could specify that receiver 2's "current gross annual income" be greater than 150.000 US dollars. As another example, sender 1 could specify what receiver 2 is Uncle John, the correct John Doe, on the basis of age (above 50) and zip code of home address (02139) or home telephone number (617-253-0000), using normal facts, with perhaps, for added safety, the criteria, based on an adhoc fact, that receiver 2 has a nephew named Ernie.

Going back to FIGS. 5A-5C while keeping FIG. 4 in mind, when SA filter inbox application 8 has successfully processed filter from RX 17, identified by filter ID 80, SA message editing application 9 creates a new entry in mail outbox 21 (step 276). This entry comprises C-filter to RX 118, which is a copy of outgoing C-filter 121, C-filter ID 120, whose value is set by mailbox services 14 in the same way as formerly message ID 110, filter ID 102, which is set as before equal to filter ID 80, and SA Message 18, whose value is set equal to invitation message 37 in the original plan 23, whose filter reference 114 points to C-filter 121, plus other fields whose usage will become apparent later. In FIGS. 5A-5C, SA Message 18 is kept only to reminds sender 1 of the message encrypted inside C-filter to RX 118 as invitation message 37 (step 279). The software engineer skilled in the art will notice that sender 1 may want to edit invitation message 37 in plan 23 after outgoing C-filter 121 has been created, thus introducing a potential difference between SA Message 18, taken directly from plan 23, and the message inside C-filter to RX 118, taken from outgoing C-filter 121. One way to prevent such a difference is to delete outgoing C-filter 121 each time the corresponding plan 23 is edited, thereby forcing a new compilation and enforcing message consistency. When SA message editing application 9 uploads C-filter to RX 118 (step 277), mailbox services 14 creates an entry in filtered box 103 in the same way as before: C-filter 125 and C-filter ID 126 replace message M 105 and message ID 106 respectively, S user ID 107 remaining unchanged while structure 123 is added and used as later detailed. When RX mail inbox application 10 downloads the mail (step 286), it creates an entry in mail inbox 22 with C-filter 129, copy of C-filter 125, and C-filter ID 128, copy of C-filter 126, respectively replacing SA message 19 and message ID 108, together with fields 81 to 84, 91 and 94 according to FIG. 3 and further fields used as later described. RX mail inbox application 10 now behaves like SA filter inbox application 8 with flag 72 and 73 on, for automatic list processing. As SA filter inbox application 8 downloads the filters from filter caching services 13, as identified from some filter ID list submitted either directly by sender 1 or through directory services 12, so RX mail inbox application 10 downloads all C-filters from mailbox services 14 from all filtered boxes, such as filtered box 103, which service R user ID 111 whose value equals the value of R user ID 109. Furthermore, as SA filter inbox application 8 processes the filters as they are downloaded, in batches of size batch processing size 86, so RX mail inbox application 10 processes the C-filters (steps 291-293). Since counter-filter flag 35 of a C-filter is off, RX mail inbox application 10 does not call RX message editing application 9 when it has evaluated the Boolean expression 68, here renamed "desirable correspondent profile list", but determines which of messages 36 or 37 applies and leaves C-filter 129 with its processing status 83 set accordingly to either "rejection" or "invitation". In one embodiment RX mail inbox application 10 further purges all entries for which C-filter processing status 83 has been set to "rejection". When receiver 2 uses RX mail inbox application 10 to read the mail, he or she selects a particular C-filter whose processing status is "invitation" (steps 294-295). If RX mail inbox application 10 has not been able to reach that stage, receiver 2 may select a C-filter whose processing status is either "to be processed" or "incomplete" and uses RX mail inbox application 10 as sender 1 uses SA filter inbox application 8 with flag 72 and 73 off, in manual single mode, to bring processing status to either "rejection" or "invitation". When opening a C-filter of "invitation" status, RX mail inbox application 10 effectively display invitation message 37, i.e. the message from sender 1, for the perusal of receiver 2 (step 296). For the same reason as SA message 18 is duplicated in mail outbox 21 to give sender 1 a permanent readable record, invitation message 37, once displayed, is copied as SA message 19 in mail inbox 22 to give receiver 2 a permanent readable record identical to SA message 19 previously described in the embodiment without C-filtering. Receiver 2 is further prompted to make a comment 119, to facilitate future sorting and searches. For example a sports related C-filter employed for marketing purposes might be given C-filter ID WXYZ from mailbox services 14. This unique value WXYZ will then be propagated throughout the whole system as the value shared by C-filter ID's 126, 120 and 128 upon request. In a similar way, the value of the actual content of the C-filter can be seen to be copied from 121 to 118 to 125 to 129.

While so far the nature of the communication between sender SA and receiver RX has been explicitly described as an email, the present invention can be used in the context of other, non text-based messaging applications, such as voice-based messaging and communication between smart phones, as a mechanism to determine whether or not to allow a sender to start emitting. The term electronic message(s) generally should be taken to include not only emails sent from computer to computer over a network but also all other types of messages, including calling signals, that are communicated (usually electronically) over any type(s) of communications network(s) and between or among any type(s) of communicating device(s) utilized by or as sender(s) and receiver(s) such as Personal Digital Assistants (PDAs), phones, handheld devices of all kinds, etc.

In one further embodiment, message to RX 18 and SA message 19 are understood to be voice messages instead of text messages and words such as "display" (see for example step 246) and "view" (see for example steps 279, 296) are to be understood as "play" and "listen to". In another embodiment, the real time nature of the communication, either by voice (for telephony) or text (for instant messaging), means that the message to RX 18 and SA message 19 are both empty. In consequence, step 233 is null and step 247, assumed to be a permanent process, simply generates a warning signal for RX upon arrival of an empty message 19, establishes the single domain and the single filter concerned to automate steps 235 and 245 accordingly and alerts RX to take step 246 as the way to establish the desired real time communication between sender SA and receiver RX. C-filters are also available in the same context: step 293 again generates a warning signal for RX, triggers steps 235 and 294 and alerts RX to take step 295 to establish the communication. Warning signals can be either aural, such as rings or tunes, or visual in nature, such as flashing icons, or both. Aural signaling is generally used in the context of telephony and visual signaling in the context of written communication. In traditional (i.e. non VoIP) telephony, the line linking mailbox services 14, located at the local exchange, and mail inbox 22 is supposed to be inactive when no communication is in progress. In another embodiment of the invention, when mail box services 14 receives a message from SA message editing application 9, empty or not, it immediately calls on RX mail inbox application 10, which runs step 247 or 286 locally on a permanent basis, rather than wait for RX mail inbox application 10 to call.

Once receiver 2 has read SA message 19, processing status 83 of the corresponding C-filter 129 turns to "completed" or to "invitation to send facts" depending on whether sender 1 has used the capability of any filter to request feedback from its target. In one embodiment of this invention, a C-filter always includes script 25 with decision break 64 before a regular query 60, with feedback flag 65 set, relative to code 0, by convention R user ID 109, and an adhoc query 61, with feedback flag 66 set, relative to special adhoc code 43 equal to 0, label 44 equal to "reply" and definition 45 specifying type 42 free form text. In this manner receiver 2 is prompted by RX mail inbox application 10 to reply to sender 1 using his or her unique ID as a signature (step 297). If receiver 2 agrees to reply and further authorizes environment 5 to publish the reply, user ID and any requested feedback back to sender 1 (step 298), the corresponding list of labeled facts is put in RX outbound public facts 117, as recited in U.S. Pat. No. 6,092, 197 and in European Patent Application No. 98935494.9, and uploaded by RX mail inbox application 10 to mailbox services 14 which stores a copy into list 123 (step 299). While the reply is treated as any adhoc fact, whose value 93 is stored in the list 91 associated with C-filter 129 for code 92 equal to 0, and cannot be published except through RX outbound public facts 117, a copy is again stored as reply to SA 122 for easy access by receiver 2 (step 300) and a dotted line arrow appears on FIG. 5A as a mnemonic simplification. Sender 1 further requests SA message editing application 9 to automatically fetch any feedback for the entries contained in mail outbox 21, as identified by C-filter ID 120, when available at mailbox services 14 as list 123 for C-filter ID 126 equal to C-filter ID 120 (steps 278, 280). When available, SA message editing application 9 subsequently stores a copy of list 123 as inlist 124, once again giving special consideration to label "user registration", whose value is stored into R user ID 130, and label "reply" whose value is stored into Reply from RX 127. Sender 1 further uses SA message editing application 9 to select a particular entry in mail outbox 21 and review its reply from RX 127 as well as any additional feedback information (step 281). When sender 1 receives reply from RX 127, he or she can be sure receiver 2 has indeed received and seen SA message 19 as intended. Besides a simple acknowledgement, this reply and feedback feature enables sender 1 to reach any of multiple types of agreement with receiver 2. For example receiver 2 may be interested in receiving commercial solicitations from travel related companies if sender 1 is willing to pay him or her US$ 2 per solicitation. While it is unlikely that senders would pass this filter without further ado, hotel companies may find it reasonable if receiver 2 is a serious prospect as verified by the C-filter they sent along their solicitations, for example if receiver 2 has bought a plane ticket with at least one week stay in a foreign city in which they operate. In the instance, receiver 2's feedback will likely include the identity of receiver 2 and his or her travel plans, such as dates of stay, name of city, presence of traveling companions . . . , so that sender 1 can make a truly customized offer to receiver 2 while paying the requested solicitation fee. As another example a company sponsoring Lance Armstrong may, as part of its sponsorship, offers interested fans who pass C-filter WXYZ approved by Lance Armstrong the privilege to send a personal message in reply to Lance Armstrong's endorsement of this company's products. Assuming the reply from a fan to be "I want to become a professional bicycle rider. Should I train in the US or should I move to France?", this text would be first entered as adhoc fact 93, value of adhoc code 0 of the fan's copy of C-filter WXYZ from Lance Armstrong, and propagated from 93 to 122 and, via outbound list 117, list 123 and list 124, back to 127 to be read by Lance Armstrong.

In one embodiment of this invention, sender 1 may confirm an agreement reached as the result of an exchange of mails, i.e. SA message 19 and Reply from RX 127, between sender 1 and receiver 2. The same conventions as recited above for C-filters are applied to filters themselves, except that in this case the adhoc label "reply" is now called "confirmation" and the regular label "user registration" is replaced by the adhoc label "counter-filter registration". As receiver 2, using SA mail inbox application 10, filled reply to SA 122 and accepted to publish it together with R user ID 109 and further feedback information, so sender 1, using SA filter inbox application 8 on the in filter box 20 entry whose filter ID 80 equals filter ID 102, fills SA confirmation 132 (step 282), made directly accessible from the mail inbox 21 entry via SA confirmation 131 (step 285), and any additional information as requested by filter from RX 17. Sender 1 further authorizes environment 4 to copy these facts into outbound public facts 116 (step 283) and SA filter inbox application 8 further uploads this feedback to filter caching services 13, as an entry into list 135 attached to the record identified by filter ID 98 equal to filter ID 80, this entry comprising a copy S user ID 133 of S user ID 100 and a copy 134 of the feedback list (step 284). In turn receiver 2 uses RX filter editing application 6 to fetch any feedback for the entries contained in out filter box 112, as identified by filter ID 96, when available at filter caching services 13 as the entries of list 135 associated with filter ID 98 equal to filter ID 96 (steps 302-303). Contrary to the C-filter to RX 118 that is used by SA for a single correspondent RX, RX filter 15 is used by RX for multiple correspondents SA. Accordingly RX filter editing application 6, when called by receiver 2 to gather feedback from filter caching services 13, sweeps the entries of list 135 and copies them into an equivalent list 141. The answer from a specific sender identified by S user ID 133 is recorded in an entry comprising S user ID 138, equal to S user ID 133, inlist 140, copy of list 134, SA confirmation 137, value corresponding to the special fact label "confirmation", C-filter ID 139, value of the special fact label "counter-filter registration", and comment field 136 for receiver 2 to annotate the confirmation. RX filter editing application 6 further uses C-filter ID 139 to identify the corresponding entry in mail inbox 22, whose C-filter ID 128 equals C-filter ID 139, and put in SA confirmation 142 a copy of SA confirmation 137, giving receiver 2 a complete synopsis of the exchange with sender 1: SA message 19 (step 296), reply to SA 122 (step 300), SA confirmation 142 (step 301). In another embodiment of this invention the adhoc label "counter-filter registration" is specifically trapped by SA filter inbox application 8 which, instead of putting the corresponding adhoc query to sender 1, directly fetches the value from C-filter ID 120 in the entry in mail outbox 21 whose filter ID 102 is equal to filter ID 80. Assuming for example Lance Armstrong's confirmation message to be "train in Texas during the winter and in France the rest of the year", this text would be first entered as adhoc fact 93, value of adhoc code 0 of Lance Armstrong's copy of filter DCBA originally approved by the fan, and propagated from 93 to 132 and 131 and, via outbound list 116, list 134 and list 140, back to 137 and 142, to be read by the fan.

The importance of the reply and confirmation features is best understood when the original message, SA message 18, is blank or reduced to some conventional formula such as "your interests and mine match, please reply". While one might be surprised sender 1 would go to such length to send "nothing" to receiver 2, one has to considered that a reply from receiver 2 guarantees a mutual match between the conditions put by receiver 2 to receive mail and the conditions put by sender 1 to send mail. Since no profile information has been given to receiver 2 by sender 1 and since SA message 19 is blank, sender 1 is free to stop the exchange at this point without any material consequence, or send his or her confirmation to the agreement sought by receiver 2. The same remark earlier applies to receiver 2 who may have refused to reply without giving any profile information or on the contrary explicitly pursued an agreement with sender 1 by replying. In particular a party who has broken an exchange may want to update his or her profile and filter or counter filter as the case may be, before entering into another exchange. In other words appropriate negotiations and auctions can be performed with the current invention based on blank mails, relying on the filter and the counter-filter to detect the potential for an agreement while protecting the confidentiality of both parties, including with respect to third parties such as service providers 11 to 14, who have no access to SA profile 16 nor RX profile 16 nor adhoc facts contained in list 91 of either filter from RX 17 or C-filter 129 according to the privacy capability of environments 4 and 5, until a mutual agreement is reached and acknowledged.

It is the general goal of the present invention to enable unknown senders to reach unknown receivers without entrusting any profile information to anyone besides the originator of one's own profile, including to service providers, while preventing undesirable, i.e. unnecessary, mail from being generating in the first place. The possibility earlier recited of either a sender recording direct filter ID's for trusting receivers in the standard address book (code 1 of a vocabulary by convention) or a receiver recording the user ID of trusted senders in the trusted sender book (code 2) is a matter of convenience and efficiency when a known relationship exists but does not contribute in itself to the creation of new ones. It is a further goal of the present invention, while respecting the overarching privacy protection of entrusting no profile information about anyone to anyone else, to bring the two cases together by allowing a third party known to both a sender and a receiver who do not know each other, to act as a bridge between them by recommending the sender to the receiver. This feature merely translates what goes on in real life. Rather than spending time to make one's preferences explicit, most people would rather follow the lead of someone they trust on the subject. Conversely most people with a clear purpose in mind seek influencers, whose references open whole networks. For example recommendations are commonly used by candidates seeking employment or by marketing managers seeding a new market. As another example, retailers selling sports star sponsored products could be allowed by a sports good manufacturing company to recommend a limited number of clients to the sports stars with whom the company has signed a contract and give these clients the privilege to send a mutually desirable email to their favorite idol. In the latter example, the motivated sender A 1 is no longer the sports star as in earlier examples but the fan.

Figure 6A:
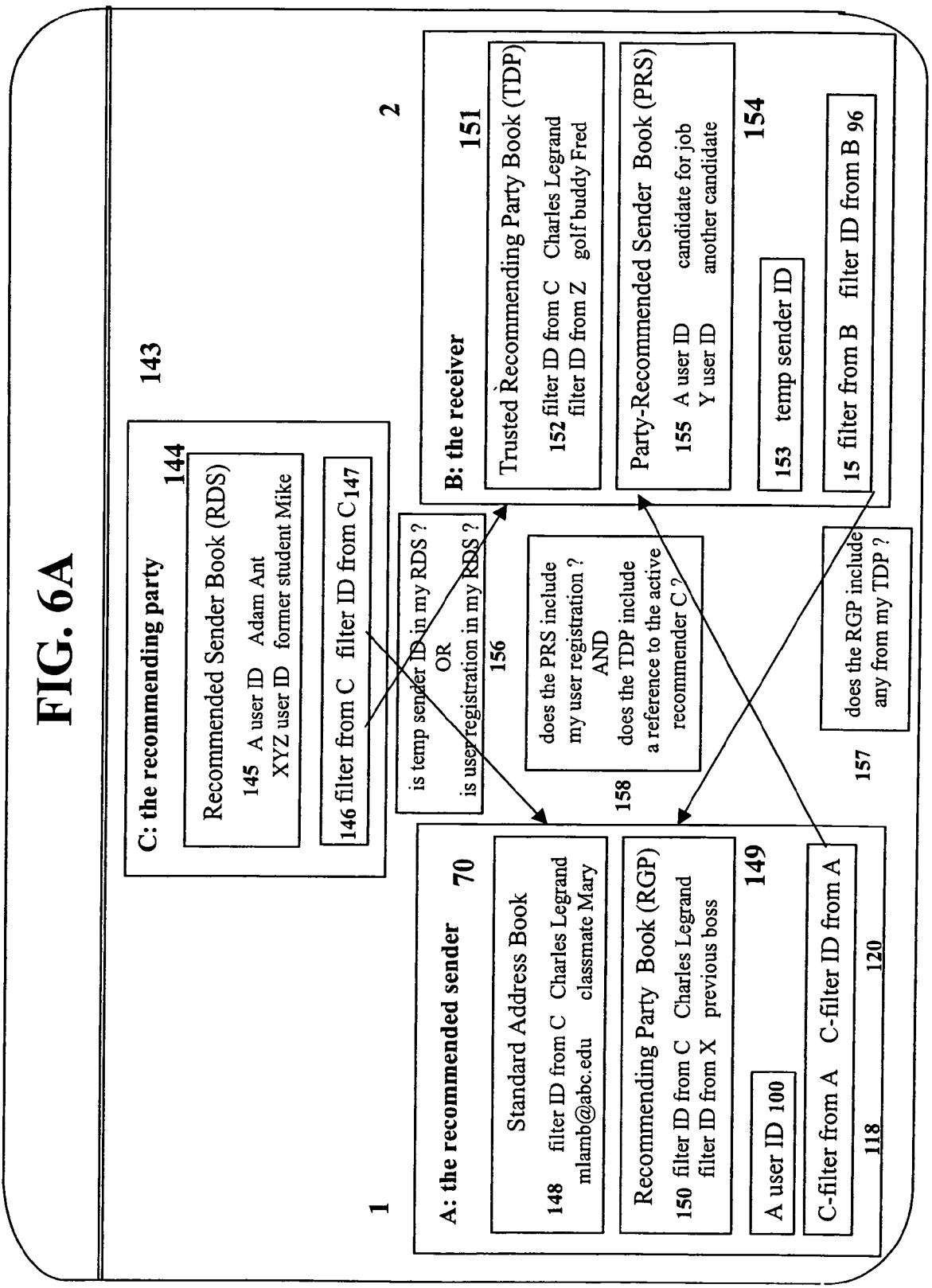
FIG. 6A details the special data structures of the system according to one embodiment of the the present invention for enabling spam free email to be received upon the recommendation of a third party.
Figure 6B:
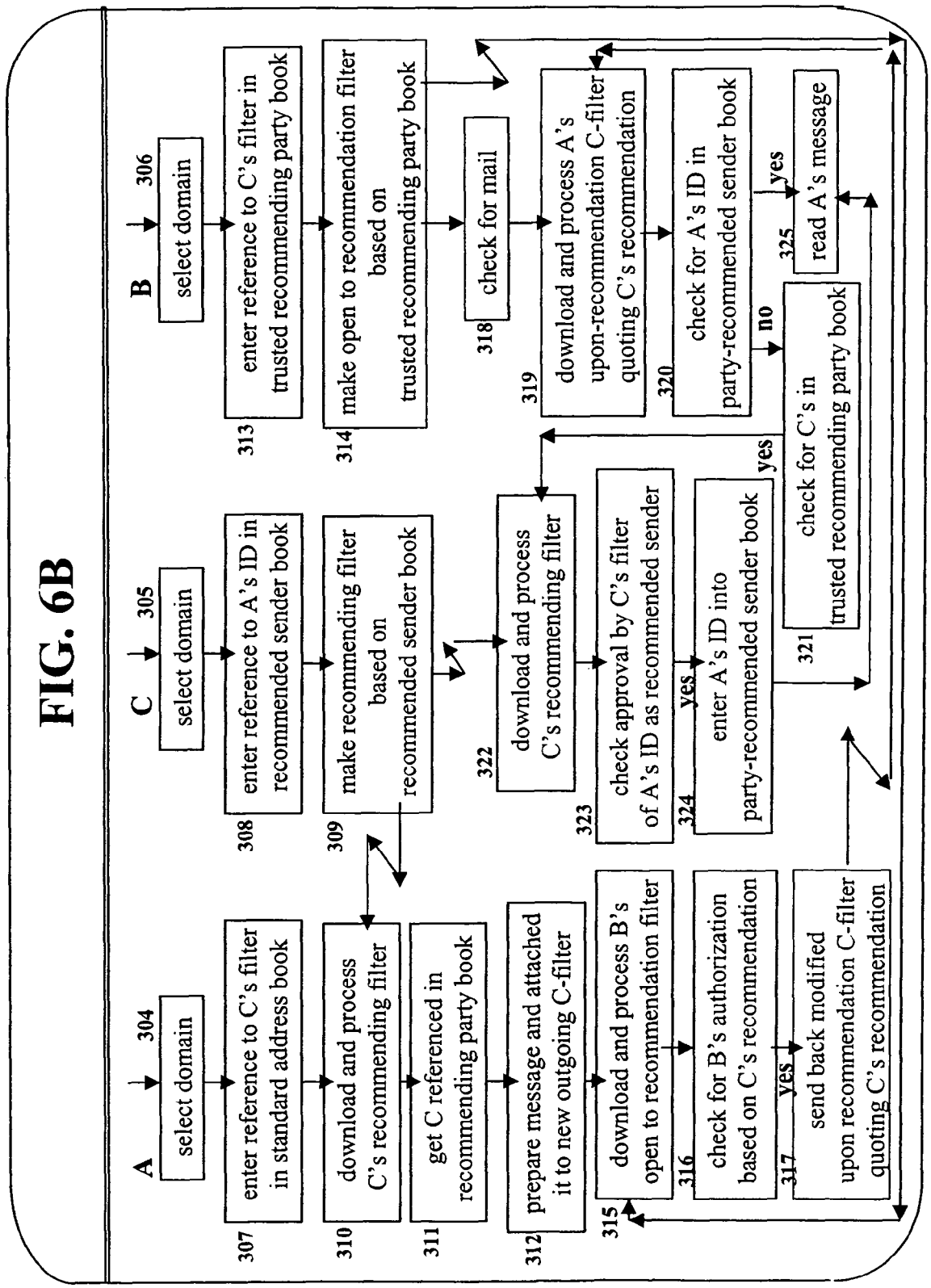
FIG. 6B is an embodiment of a flow chart to accompany FIG. 6A.

Referring now to FIGS. 6A and 6B, shown are the special data structures of the system according to one embodiment of the present invention for enabling email to be received upon the recommendation of a third party. Sender A 1 is the recommended party, Adam Ant for instance, receiver B 2 is the party who accepts the recommendation and third party C 143 is the party making the recommendation, Charles Legrand for instance. All parties are fitted with the full capability of sending and receiving spam free emails as previously described in relation with FIGS. 1A to 5C, including the power to manage filters and counter filters. Third party services may likewise be available to A 1, B 2 and C 143. It is further assumed that recommender C 143 has already established a relation with both A 1 and B 2 within the framework of some shared domain vocabulary 32 (see steps 304-306). The relation between C and A leads A 1 to enter reference 148, given by C 143 to A 1 to a specific filter 146 compiled by C for the purpose of making recommendations and equal to filter ID from C 147, into column 75 of A's standard address book 70, which is stored at code 1 of A's profile 16 for domain vocabulary 32 (step 307). For instance, entry 147 and consequently entry 148 will read SRQP. As A 1 enters reference 148, he or she makes a comment such as "Charles Legrand" into column 76 to be reminded of the meaning of the entry. In exchange A 1 has given C 143 his or her user registration ID 100, which is stored at code 0 of A's profile, for instance EIOU. C 143 now enters this third-party defined unique reference as entry 145 into a new profile fact 144 of type 42 "address book" for some new fixed arbitrary code 39, for example code 3, called the "recommended sender book", together with an appropriate comment (step 308) such as "Adam Ant". Similarly the relation between C and B leads B 2 to enter the reference (SRQP in the instance) given by C 143 to B 2 to the same specific filter 146 as entry 152 into a new profile fact 151 of type 42 "address book", for some new fixed arbitrary code 39, for example code 5, called the "trusted recommending party book", together with an appropriate comment (step 313) such as "Charles Legrand". The links between A and C on the one hand and B and C on the other are not symmetrical: by deleting filter from C 146, C 143 can terminate the relationship with both A 1 and B 2 at will while A 1 cannot so easily renounce his or her user registration, which C has obtained. The profile 16 of A 1 further comprises a new fact 149 of type 42 "address book", for some new fixed arbitrary code 39, for example code 4, called the "recommending party book". The profile 16 of B 2 further comprises a new fact 154 of type 42 "address book", for some new fixed arbitrary code 39, for example code 6, called the "party-recommended sender book". The profile 16 of B 2 further comprises a new fact 153 of type 42 "third-party unique reference", for some new fixed arbitrary code 39, for example code 7, called the "temporary sender ID". While codes 1 (A's standard address book 70), 3 (C's recommended sender book 144) and 5 (B's trusted recommending party book 151) are used by the participants A, B and C to prime the recommendation of A by C to B, codes 4 (A's recommending party book 149), 6 (B's party-recommended sender book 154) and 7 (B's temporary sender ID 153) are used by the system to apply and verify this recommendation on behalf of the participants A, B and C. The handling of codes 4, 6, 7 and 0 mentioned above are further subject to three special features. First, the corresponding profiles cannot be updated through profile editing application 7. More precisely the values recorded in column 75 of the recommending party book (code 4) and the party-recommended sender book (code 6), as well as the values of temporary sender ID (code 7) and user registration (code 0), cannot be updated by the user in whose profile 16 they reside. This keeps a recommendation, once primed, from being tampered with. Second, criteria built against these codes take their parameters from specific local address books or third party unique references. More precisely when a user builds a simple criteria 46 of type 51 "address book" with code 49 equal to 4, i.e. to be matched against a remote recommending party book (code 4), the user is asked to pick the parameters of its definition 50 from column 75 of the local trusted recommending party book (code 5). This enables the system to apply recommendations, such as one claimed by A as coming from C, for B's benefit. With a criterion against a remote party-recommended sender book (code 6), the parameter is the local user registration (code 0). This allows A to reference a recommendation that has already been accepted by B and verified with the recommender C. With a criterion against the temporary sender ID (code 7), the user is asked to pick the parameters of its definition 50 from column 75 of the local recommended sender book (code 3). This enables C to verify a recommendation that A has presented to B as coming from C. And, as previously mentioned, when a local user builds a simple criteria 46 of type 51 "address book" with code 49 equal to 0, i.e. to be matched against the third party unique reference of a remote user (code 0), the local user is asked to specify the local address book from whose column 75 the parameters of definition 50 are to be taken, either the trusted sender book (code 2) or the recommended sender book (code 3) or the party-recommended sender book (code 6). This guarantees that user ID's are only matched against other user ID's. Third, the presence in a filter or counter-filter of a criteria against codes 4, 6 and 7 flags the filter or counter-filter as special, triggering special actions, below detailed, when processed by filter inbox application 8, for filters, or mail inbox application 10, for counter-filters.

The recommending party, C 143, must have prepared the "recommending filter", filter from C 146, whose reference filter ID from C 147 (SRQP in the instance) is given to both A 1 and B 2 (step 309), according to the following way. The desirable sender Profile List 68 must include the two entries 156, the first for parties to whom the recommendation is made, the second for those for whom the recommendation is made. The first entry is a simple criteria whose code 49 is equal to 7, i.e. made against the remote temporary sender ID, and the second entry is a simple criteria whose code 49 is equal to 0, i.e. made against the remote user registration. The parameters for both criteria definition 50 are taken from the local recommended sender book 144 and are assumed to include entry 145, i.e. A's user ID 100 (EIOU in the instance). C 143 may use some ready made template from template services 11 for greater convenience. With this recommending filter, C can both recognize a sender such as A, whom C is willing to recommend, and verify a recommendation presented by some receiver B as given by C to some sender A. In order to avail him or her self of C 143's recommendation, A 1 then sends an email, which may be blank although a courtesy note is in order, to C 143, using entry 148 in the standard book 70, which refers to filter ID from C 147 (SRQP in the instance). This brings about the download of C's recommending filter 146 and its subsequent processing by filter inbox application 8 of A 1 (step 310). Upon encountering the criteria against code 7 listed in filter 146, filter inbox application 8 will recognize this filter as a special "recommending filter". Processing of a "recommending filter" at A's differs from regular processing in two ways. First, if code 7 is not present in A 1's profile 16 or does not match, this criterion will be evaluated as negative but any action normally taken in case of a missing fact will be skipped. Second, when encountering the criteria against code 0 listed next in filter 146, filter inbox application 8 will, if this criteria is evaluated as positive, i.e. A user ID 100 indeed matches one of the parameter listed by C (EIOU in the instance), make a new entry 150 into A's recommending party book 149, with field 75 equal to filter ID 80, which is equal to filter ID from C 147 (SRQP in the instance), and a formulaic comment in field 76 taken from title 81 and downloading date 82 which A 1 will update later to be more meaningful (step 311). In other words the authorization granted to A by C's recommending filter is taken as a signal to register C's recommendation in A's profile.

In order to effectively recognize C's recommendation, B 2 must have prepared an "open to recommendation filter", filter from B 15 (step 314), according to the following way. One of the simple criteria 157 must have code 49 equal to 4, i.e. made against the recommending party book, and the parameters for criteria definition 50, taken from the trusted recommending party book 151, are assumed to include entry 152, i.e. a reference equal to filter ID from C 147 (SRQP in the instance). B's filter being otherwise unconstrained, B is free to accept senders without a recommendation or to submit recommended senders to further criteria. It is now assumed that A 1, by any means available, e.g. via some list provided by directory services 12, makes filter inbox application 8 download and process B's filter from B 15 (step 315). Upon encountering the criteria against code 4 listed in filter 15, filter inbox application 8 will recognize this filter as a special "open to recommendation filter". Processing of an "open to recommendation filter" differs from regular processing in two ways. First, if code 4 is not present in A 1's profile 16, the criteria against it will be evaluated as negative but any action normally taken in case of a missing fact will be skipped. Second, if this criteria is evaluated as positive, i.e. A's recommending party book has an entry, filter ID for C 150 in the instance, matching one included by B from his or her trusted recommending party book (SRQP in the instance), filter inbox application 8 will compel A into using an "upon a recommendation" C-filter, C-filter from A 118. When C's recommendation has been material to B authorizing A to send a message, the purpose of this special C-filter is to enable B to learn of this circumstance and, the first time around, automatically verify the corresponding recommendation with C, thereby preventing A from forging a recommendation from C without tampering with C's environment. Such a C-filter is characterized by having the first entry in the desirable sender Profile List 68 be a profile test whose first two entries 158 are as follows. The first entry is a simple criteria whose code 49 is equal to 6, i.e. made against the party-recommended sender book, and whose parameter for criteria definition 50 is equal to the local user registration, i.e. A user ID 100 (EIOU in the instance). The second entry is a simple criterion whose code 49 is equal to 5, i.e. made against the trusted recommending party book, and whose parameter for criteria definition 50 is equal to the very entry 150 (SRQP in the instance) which triggered the recognition of the "open to recommendation filter". This requires filter inbox application 8, when and if it is ready to authorize message editing application 9 to send an email (step 316), to call upon filter editing application 6 at A 1 to retrieve from plan box 113 plan 23 associated with outgoing C-filter 121 (step 312), first to create a new profile test in plan 23 if the first entry in list 68 had only been a weighted test or a simple criteria, this new profile test starting with the former entry, second to insert, if not already present, the two special criteria above specified at the beginning of the first profile test in list 68, whether old or new, and third to recompile plan 23 in an updated version of outgoing C-filter 121 (step 317). Remembering that evaluation of a Boolean expression terminates in the present invention as soon as its result is known, the software engineer skilled in the art will see that A may well be authorized by B's filter filter from B 15 without B's filter being taken as an "open to recommendation" and A's C-filter C-filter from A 118 being forced into an "upon recommendation counter filter". It will also become apparent that, if transformed into an "upon recommendation counter filter", A's C-filter will continue to select A's correspondents in the same way as originally intended by A.

Assuming that A 1 has made use of C's recommendation in the processing of B's "open to recommendation filter" 15, mail inbox application 10 at B 2 downloads and processes an "upon recommendation counter filter" 118 from A (steps 318-319). Upon encountering the criteria against code 6 listed in filter 118, mail inbox application 10 will recognize this filter as a special "upon recommendation counter filter". This enables verification of a recommendation used by the sender party A if not already done by the receiving party B. Processing of an "upon recommendation counter filter" differs from regular processing in the following way. If this criteria against code 6 is evaluated as positive, i.e. A is already explicitly listed by B as being recommended, processing of A's counter-filter 118 proceeds as usual (steps 320, 325). Otherwise, if code 6 is not present in B 2's profile 16 or if the criteria against it is evaluated as negative, i.e. if A user ID 100 (EIOU in the instance) is not found in column 75 of the party-recommended sender book (step 320—no), mail inbox application 10 will ignore this criteria in evaluating the global Boolean expression expressed by list 68 of B's counter filter and skip any action normally taken in case of a missing fact but will enter the criteria parameter value, i.e. A user ID 100, into temporary sender ID 153 (EIOU in the instance). Mail inbox application 10 will further expect the next criteria to be against code 5 and, if not, will evaluate the global Boolean expression as negative. If this criteria against code 5 is evaluated as negative, i.e. if B's trusted recommending party book 151 does not include the reference (SRQP in the instance) to the party upon whose recommendation this counter-filter has been prepared, mail inbox application 10 will again ignore this criteria and proceeds over the rest of list 68 in the regular way, in essence returning A's counter filter C-filter from A 118 to its original state when dealing with targets other than the one intended. However if the criteria against code 5 is evaluated as positive, i.e. if B is indeed relying on the recommendation in play (step 321—yes), mail inbox application 10 temporarily suspends its processing and causes filter editing application 6 at B 2 to prepare a courtesy message along some ready made formula such as "checking recommendation of" followed by the value of temporary sender ID 153. Mail inbox application 10 further causes filter inbox application 8 at B 2 to fetch filter from C 146 based on the reference 152 in trusted recommending party book 151 (code 5) that has matched with the criteria against it (SRQP in the instance). Filter inbox application 8 further downloads and processes C's recommending filter 146 (step 322). Upon encountering the criteria against code 7 listed in filter 146, filter inbox application 8 will recognize this filter as a special "recommending filter". Processing of a "recommending filter" at B's differs from regular processing in the following way. Once filter inbox application 8 has evaluated whether or not to authorize message editing application 9 to send the courtesy mail, (step 323) it proceeds to wake up mail inbox application 10 with the result of its evaluation. The software engineer skilled in the art will recognize that if B is itself on C's recommended sender book, this result is ambiguous. Assuming B has not put him or her self in this situation, mail inbox application 10 will receive a positive signal if and only if A's claim to be recommended by C has been independently verified by C. Under the same assumption, mail inbox application 10 will not receive a positive signal if A's claim to be recommended by C has not been independently verified by C. Given a positive result, mail inbox application 10 further makes a new entry 155 into B's party-recommended sender book 154, with field 75 equal to temp sender ID 153, which is equal to A user ID 100 (EIOU in the instance), and a formulaic comment taken from title 81 and downloading date 82 which B 2 will update later to be more meaningful (step 324). This entry will prevent redundant checking with C on subsequent mails from A.

The software engineer skilled in the art will recognize that the same triangular interaction between A 1, B 2 and C 143, which allows B to recognize, verify and accept A's claim to be recommended by C, can be embodied in a variety of ways, corresponding to different efficiency trade offs. For example, in another embodiment of the present invention, the "upon recommendation counter-filter" does not carry any additional criteria but rather includes special parameters in its header 24 to convey both the user registration of its sender, i.e. A user ID 100, and a reference allowing its receiver to contact the recommender at the origin of the recommendation to mail inbox application 10 at B 2, together with a flag identifying it as an "upon recommendation counter-filter". In yet another embodiment criteria 157 used by B 2 to check if sender A 1 is recommended can be complemented with a simple criteria whose code 49 is equal to 0, i.e. made against the remote user registration and whose definition 50 parameters are taken from the party-recommended sender book 154. If B's filter from B 15 allows this criteria to be evaluated as an alternative ahead of criteria 157, for example by including it into a separate profile test from list 27 written at the beginning of the desirable sender profile list 68, the software engineer skilled in the art will recognize that, whenever A 1's user ID 100 has already been entered into B 2's party-recommended sender book 154, filter inbox application 8 at A 1 will reach a positive conclusion, if any, without having to evaluate criteria 157 and hence will not generate an "upon recommendation counter-filter".

In every day interactions in society, the behavior of the actors A, B and C detailed above may go beyond the simple case of C giving A a reference which B will accept. For example a recommender will often want to actively introduce the person recommended to those who will accept his or her recommendation. In another example the person accepting the recommendation will not act for him or her self but on the behalf of a fourth party he or she represents. For example a university professor will often enjoy the ability to recommend recent students but give a few trusted older disciples a gate-keeping role rather than dealing directly with all recruiters interested by this talent pool. For another example a sports manufacturing company may shield the sports stars with whom it has signed a sponsoring contract from its network of retailers who act as recommenders for fans while giving these fans the same privileges as earlier mentioned. It is a further goal of the current invention to support both introductions and representations to further the growth of mutually desirable mail in a spam free email world.

Figure 7A:
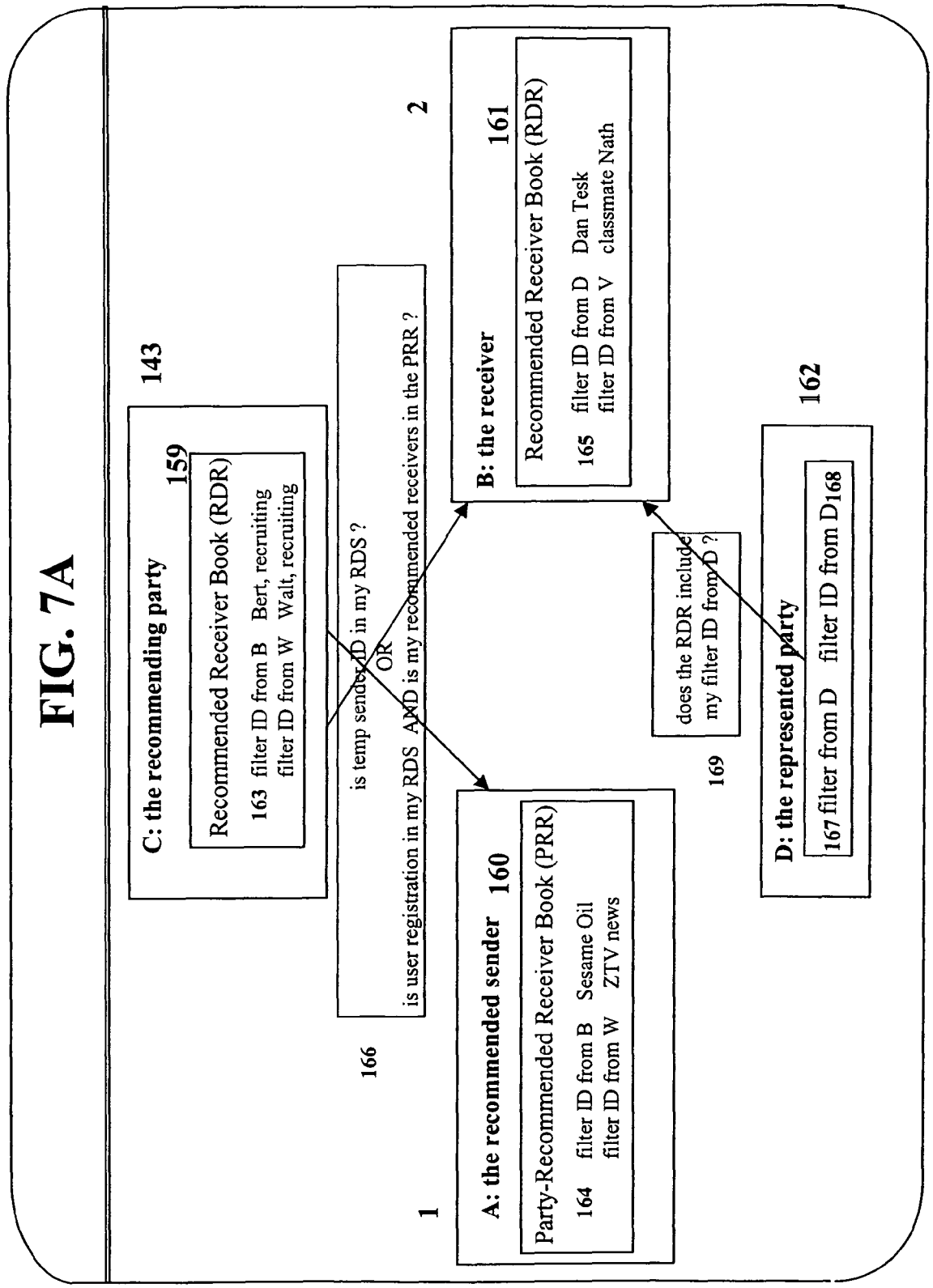

Referring now to FIG. 7A, shown are the additional data structures of the system according to one embodiment of the present invention for enabling introductions by a third party using spam free email, to which FIGS. 6A and 6B are added by reference. C 143, the recommending party, is provided with yet another address book, the recommended receiver book 159, in which he or she enters references, such as 163, to the "open to recommendation filters" prepared by receivers ready to recognize the recommendation, such as filter from B 15 shown in FIG. 6A, assuming that receiver B 2 has previously communicated this information to recommender C 143, for instance value DCBA, already picked for filter ID 96 and shared by entry 163. Likewise the person seeking a recommendation, A 1, is provided with another address book, the party-recommended receiver book 160. In keeping with previous conventions, the recommended receiver book is assigned code 8 in the domain vocabulary 32 shared by all parties and the party-recommended receiver book code 9. The handling of code 9 is further subject to two of the special features attributed to codes 4, 6 and 7. More precisely the values recorded in column 75 of the party-recommended receiver book (code 9) cannot be updated by the user in whose profile 16 they reside. And when a user builds a simple criteria 46 of type 51 "address book" with code 49 equal to 9, i.e. to be matched against a remote party-recommended receiver book (code 9), the user is asked to pick the parameters of its definition 50 from column 75 of the local recommended receiver book (code 8).

In preparing the "recommending filter" filter from C 146, recommender C 143 modifies slightly its desirable sender Profile List 68, turning the two entries 156 into the two entries 166. While the first entry remains the same, i.e. a first simple criteria whose code 49 is equal to 7, i.e. made against the remote temporary sender ID, the second entry is now a profile test from list 27, whose list of conditions 58 contains two simple criteria, a second simple criteria identical to the second entry in 156, i.e. a simple criteria whose code 49 is equal to 0, i.e. made against the remote user registration, and a third new simple criteria whose code 49 is equal to 9, i.e. made against the remote party-recommended receiver book. As for entries 156, the parameters for criteria definition 50 for the first two simple criteria mentioned are taken from the local recommended sender book 144 and are assumed to include entry 145, i.e. A's user ID 100 (EIOU in the instance). The parameters for criteria definition 50 for the third simple criteria mentioned are taken from the local recommended receiver book 159 and are assumed to include entry 163, i.e. the direct address of filter from B 15 (DCBA in the instance). When A 1 avails him or her self of C 143's recommendation and downloads filter from C 146, filter inbox application 8 at A 1 recognizes filter from C 146 as a special "recommending filter" and takes the special actions as described above. However filter inbox application 8, upon processing the criteria against code 9, departs further from normal processing in excluding this criteria from the Boolean expression but instead, in case the Boolean expression has evaluated as positive, in copying its definition 50 parameters into A 1's local party-recommended receiver book 160, making for instance a new entry 164, with field 75 equal to entry 163, i.e. filter ID from B (DCBA in the instance), and a formulaic comment in field 76 taken such as "introduced by" followed by filter ID 80, which is equal to filter ID from C 147 (SRQP in the instance) and which A 1 will update later to be more meaningful, for instance recording "introduced by Charles Legrand". At will, A 1 may now use the content of the local party-recommended receiver book 160 to direct filter inbox application 8 to download the corresponding filters, knowing that these filters should be "open to recommendation filters" recognizing the recommender C and hence giving A the benefit of C's recommendation.

Referring now to FIGS. 7A and 7B, shown are the additional data structures of the system according to one embodiment of the present invention for enabling representations on behalf of a fourth party, using spam free email. D 162 is the fourth party who desires to widen the circle of desirable senders by asking trusted people such as B 2 to represent him or her, i.e. to accept mail from desirable senders, such as A 1, by combining both D's conditions and B's sources of recommendation, such as C 143, and to forward such mail from A 1 back to D 162. To enable representations, the handling of code 8, which refers to the recommended receiver book, such as 159 for C 143 or 161 for B 2, is further subject to one of the special features earlier attributed to codes 4, 6 and 7. More precisely, the presence in a filter of a criterion against code 8 flags the filter as special, triggering special actions, below detailed, when processed by filter inbox application 8. D further prepares a special "to be represented filter" filter from D 167, whose reference filter ID from D 168, for example LKJI, is given to B 2 to record as entry 165 in recommended receiver book 161, according to the following way. The desirable sender Profile List 68 of filter from D 167 must include as its first entry 169, a simple criteria whose code 49 is equal to 8, i.e. made against the remote recommended receiver book and whose parameter for criteria definition 50 is equal to filter ID from D 168 (LKJI in the instance). The software engineer skilled in the art will recognize that a "to be represented filter" must be made as an update to an existing filter in order for D 162 to learn the value of filter ID from D 168 from filter caching services 13 and include it in entry 169. The pre-existing filter may be an ordinary filter or a special "open to recommendation filter" containing an entry 157.

To represent D 162, the receiver B 2 downloads "to be represented filter" filter from D 167, using for example the copy of filter ID from D 168 found in entry 165 (LKJI in the instance) to address filter caching services 13 and retrieve filter from D 167 from filter from D 185, the copy held in record 170. Upon processing the first criteria against code 8 contained in entry 169, filter inbox application 8 at B 2 recognizes the filter as a "to be represented filter". If the criterion is evaluated as positive, i.e. if B 2 has indeed previously listed D 162 as a recommended receiver, processing takes the following special action. Besides authorizing message editing application 9 to send a courtesy message to D 162 such as "B has taken your filter for representation", filter inbox application 8 at B 2 further causes filter editing application 6 at B 2 to create an "open to recommendation filter" filter from B 15 whose list 68 is reduced to the single entry 157, i.e. the mandatory entry for the filter to be an "open to recommendation filter" from B. Filter inbox application 8 at B 2 further causes filter editing application 6 at B 2 to upload this filter to filter caching services 13 to record as filter from B 182 in new compound entry 171. Compound entry 171 is built, relative to filter from B, as entry 170 relative to filter from D, but comprises further filter from D 172 and filter from D ID 173 (LKJI in the instance), copies of the content of entry 170 as relayed by filter inbox application 8 at B 2 via in filter box 20.

Entry 171 acts as a pouch addressable under the reference (DCBA in the instance) to the "representing filter" 182 from B but further carrying the "to be represented filter" 172 from D (with ID 173 equal to LKJI in the instance). When a sender such as A 1 requests access to filter from B 182 stored in compound entry 171 through any means, including an introduction from C 143, filter caching services 13 instead serves filter from D 172 to filter inbox application 8 at A 1. Upon processing the first criteria against code 8 contained in entry 169, filter inbox application 8 at A 1 recognizes the filter as a "to be represented filter". First, if code 8 is not present in A 1's profile 16, this criteria will be evaluated as negative but any action normally taken in case of a missing fact will be skipped. Second, if the criteria is evaluated as negative, i.e. A does not know D as a recommended receiver, the criteria is ignored in the evaluation of the global Boolean expression expressed by list 68 of D's filter and processing continues as follows. If no criteria 157 is invoked, i.e. D's filter is not an "open to recommendation filter" or A is accepted by D without the need for a recommendation, then the processing concludes as if A 1 had downloaded filter from D directly from entry 170 in filter caching services 13, i.e. the representation role of B 2 has been to simply deliver D's filter to A under cover of B's filter ID. In particular, filter inbox application 8 at A 1 may cause the creation in mailbox services 14 of record 177 to be put in filtered box 175 designed for D's mail as filtered by filter from D 185, record comprising C-filter 1 from A 179, C-filter 1 from A ID 180 and A user ID 181 (EIOU in the instance) as recited earlier in relation with FIG. 5A. In particular C-filter 1 from A 179 is not an "upon recommendation counter filter" and will not trigger the verification of a recommendation. However, if a criterion 157 is encountered and processed by filter inbox application 8 at A 1, processing is further modified to allow D access to B's network of trusted recommenders as follows. First filter inbox application 8 at A 1, knowing that "to be represented filter" 172 from D came from a compound entry 171, downloads filter from B 182, extracts its single criteria 157 and substitutes it for the original criteria 157 prepared by D, i.e. the representation role of B 2 is also to give D the benefits of B's network of recommenders such as C. Second if processing of this spliced filter from D authorizes A to send an email as recited earlier in relation with FIGS. 6A and 6B, filter inbox application 8 at A 1 no longer compels the introduction of entry 158 into C-filter 1 from A to turn it into an "upon recommendation counter filter". Rather filter inbox application 8 at A 1 causes filter editing application 6 at A 1 to create a separate "upon recommendation counter filter" solely containing entry 158 and to upload it to mailbox services 14 to record as C-filter 2 from A 183 into new compound entry 176 to be put in filtered box 174 designed for B's mail as filtered by filter from B 182. Entry 176 is built relative to filter from B as entry 177 relative to filter from D but comprises further C-filter 1 from A 326 and C-filter 1 from A ID 178, identical to C-filter 1 from A 179 and C-filter 1 from A ID 180 respectively, as well as filter from D ID 184 (LKJI in the instance) obtained from in filter box 20 and passed on by filter inbox application 8 at A 1. In other words the message from A to D is mediated through B, who receives a pouch containing both the message from A to D, in C-filter 1 from A 326, and the information necessary to verify the recommendation claimed by A, in C-filter 2 from A 183.

As recited earlier in relation with FIGS. 6A and 6B, mail inbox application 10 at B 2 downloads and processes "upon recommendation counter filter" C-filter 2 from A 183. If mail inbox application 10 at B 2 arrives, directly, in view of A user ID 100 being already listed in B 2's party-recommended sender book 154, or indirectly, after having received C 143's "recommending filter" 146, at a positive conclusion, i.e. accepts A's recommendation, mail inbox application 10 now makes a further test. If C-filter 2 from A 183 is reduced to entry 158, it checks with mailbox services 14 to see whether C-filter 2 from A 183 came from a compound entry or not. If entry 174 is compound, mail inbox application 10 further provides mailbox services 14 with the order to forward C filter 1 from A 326 to D, using filter from D ID 184 (LKJI in the instance) to identify the correct filtered box 175 into which to create record 177 from the contents of record 176. D is now ready to receive a message from A as if A had been in direct contact with D but with the assurance that any recommendation from B's network material to the contact between A and D has first been verified by B.

The current invention dispenses altogether with the analysis of email, relying instead on factual declarations by the persons directly concerned by the exchange: the sender and the receiver, potentially a recommending party and a represented party. It is an unfortunate fact of life that, while people know best the confidential data they originate, they may also choose to lie about it. Some lies have no negative effect on the desirability of emails. For example senders of commercial mails relative to racing quality bicycles will not object to receivers wishfully thinking themselves to be champion material. Other lies however are more grievous. For example receivers will not appreciate senders passing themselves as bicycle amateurs, who write about the sport and whose reason for sending mail is to tell anecdotes, in order to send sales messages on erectile dysfunction remedies. Yet it is also a fact that lies of the latter kind are normally made for commercial gain. By giving senders legitimate tools to target a large population and find the most promising receivers among it before even sending an email, the current invention decreases the economic incentive for lying in the first place. It is however a goal of the current invention to further provide a mechanism to prevent lying, for when the potential economic advantage of lying remains high enough to be tempting.

Figure 8:
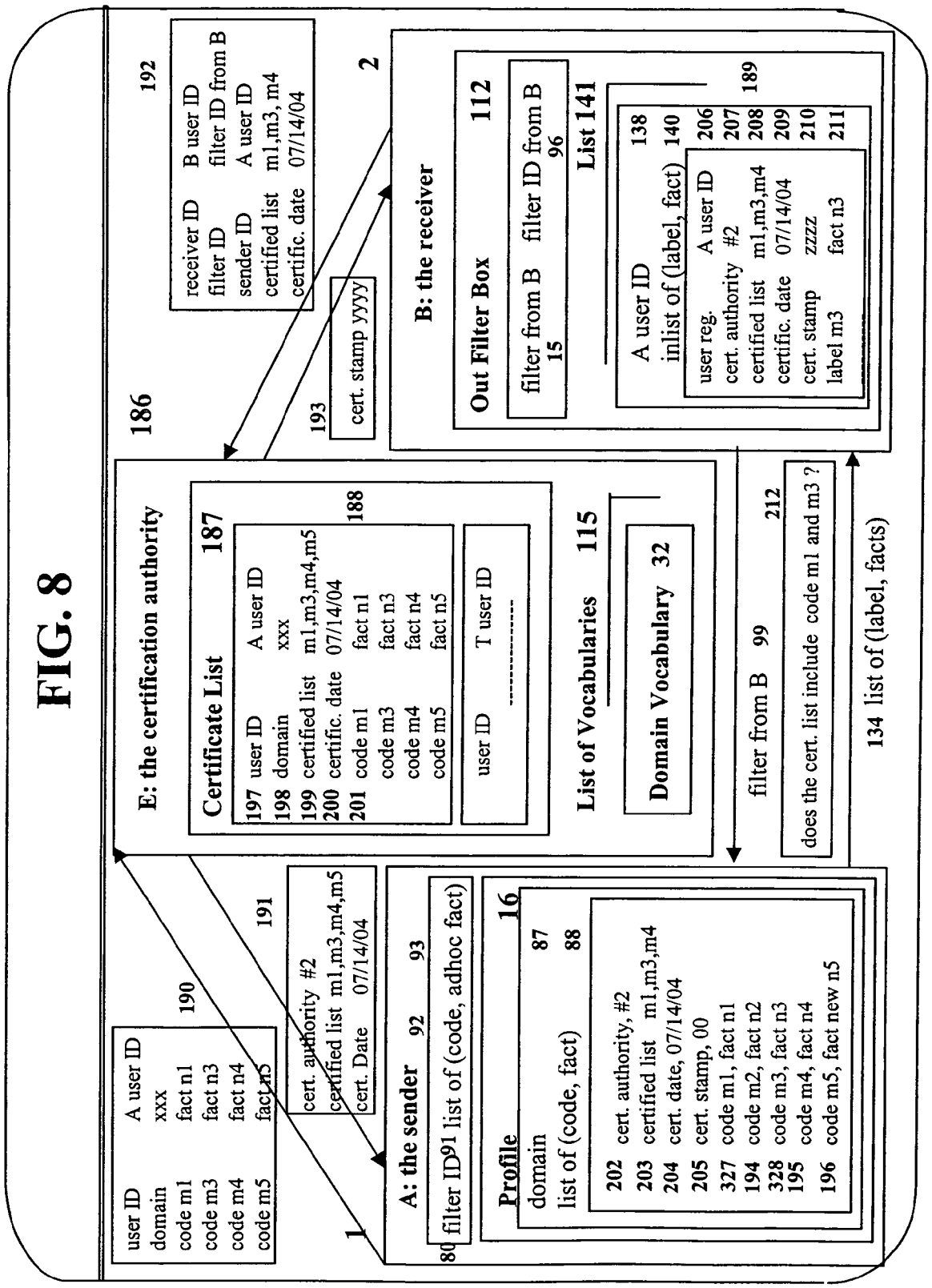
FIG. 8 details the special data structures of the system according to one embodiment of the present invention for enabling facts declared by participants in a spam free email exchange to be certified by a third party authority.

Referring now to FIG. 8, shown are the special data structures of the system according to one embodiment of the present invention for enabling facts declared by participants in a spam free email exchange to be certified by a third party authority. Because adhoc facts contained in list 91 are attached to the filter carrying their definition, in adhoc vocabulary 33, fact certification is reserved to permanent facts recorded in profile 16. Also, contrary to recommending party C 143 or represented party D 162, the certification authority E 186 is not using spam free email to communicate with the receiver B 2, who wishes to be protected against lying, and the sender A 1, who wants to accommodate B's wishes in order to send B an email. Rather E 186 is more like a third party service such as template services 11. E 186 further maintains a list 115 of all vocabularies, such as domain vocabulary 32, sports for example, for which E offers certification services and a list 187 of certificates, such as record 188, which are established upon request by senders like A 1. When for example sender A 1 wants to certify certain facts present in profile 16 at A 1 for domain 87, corresponding to domain vocabulary 32 shared by A 1, E 186 and B 2, sports for example, A 1 presents E 186 with request record 190, comprising his or her user registration, A user ID 100 (EIOU for instance), stored by convention as the fact for code 0 in vocabulary 32, the domain under consideration, sports for example, equal to domain 87, and the list of (code, fact) pairs to be certified. This list needs not of course include all the facts present in A 1's profile. In the instance code m2, entry 194 in A 1's profile 16, is not to be certified, only codes m1 (entry 327), m3 (entry 328), m4 (entry 195) and m5 (entry 196). Upon receipt of A's request 190, and assuming it has been satisfied with the veracity of A 1's declarations according to its certification charter, E 186 enters record 188 in certificate list 187, comprising A's user registration 197 (EIOU in the instance), the domain under consideration 198, sports for example, the date 200 at which the record 188 was created, the list of certified codes 199, an entry which can be cast as a vocabulary fact corresponding to a definition 41 of type 42 multiple choice closed list, and a copy 201 of the actual (code, fact) pairs submitted. E 186 further provides A 1 with a certificate 191 to be recorded in A 1's profile 16, comprising the identity of the certification authority 202, corresponding to a definition 41 of type 42 single choice closed list, plus the certified list 203 and the certification date 204, respectively identical to entries 199 and 200. Because the list of certification authorities from which entry 202 is taken is closed, the authority who defines the vocabulary is also in charge of approving certification authorities for the vocabulary under consideration. Different levels of certification charter may be recognized, from a simple guarantee against future tampering up to full due diligence by a private investigator, with or without the posting of a bond.

In order for the certification mechanism to work, the domain vocabulary codes corresponding to, respectively the certification authority list 202, the certified list 203, the certification date 204 and a fourth one called certification stamp 205, by convention assigned to code 39 10, 11, 12, 13, cannot be updated by the user through profile editing application 7 but only through a special application controlled by certification authorities. This interaction between A 1 and E 186 can be implemented in different ways. In one embodiment the certification authority E 186 may require A 1 to appear in person at an office run by E 186 and equipped with a special application able, with A's consent, to view the entries to be certified as they appear in A 1's profile and modify the four codes 10 to 13 in A 1's profile according to certificate 191. In another embodiment, this application may be running in environment 4 at A 1, communicating with E 186 through outbound public facts and inbound public facts, as recited in U.S. Pat. No. 6,092,197 and in European Patent Application No. 98935494.9, to respectively transmit request 190 and receive certificate 191, in which case certificate 191 must be augmented with a copy of the original request 190 to verify that A 1 has not, in the meantime, updated the facts to be certified. Once A 1's profile 16 has recorded the certificate 191, the behavior of profile editing application 7 at A 1 is also modified in the following way. Each time A 1 decides to update a fact that had been certified, profile editing application 7 warns A 1 that doing so will void the corresponding certification on an incremental basis. If A 1 persists, for example relative to code m5 (entry 196), the corresponding code m5 is dropped by profile editing application 7 from the certified list 203.

Whenever receiver B 2 wishes to make sure that key facts upon which to grant A 1 the right to send an email are genuine, he or she includes in filter from B 99 an additional condition such as 212, requiring for instance that codes m1 and m3 be certified. Since this involves a conjunction, i.e. an AND operation, B 2 can use a weighted test whose acceptable score range 56 is at least the number of codes to be certified and whose list 53 contains a unit weight 55 and a simple criteria 54 for every certified code, each simple criteria 54 with code 49 equal to 11, i.e. referring to the certified list 203, definition type 51 a single choice closed list and definition 50 parameter the corresponding certified code, e.g. m1 referring to entry 327).

For greater safety, receiver B 2 can further require, using a simple criteria with code 49 equal to 10, i.e. referring to the certification authority list 202, and definition type 51 a multiple choice closed list, that the certification authority may be one of a subset selected among the closed list of definition 41 parameters for code 10, for instance those certification authorities enforcing the most stringent charter. Receiver B 2 can still further require, using a simple criteria with code 49 equal to 12, i.e. referring to the certification date 204 and definition type 51 a time window, that the certification date be less that 3 months old. Assuming the integrity of the operations, this offers receiver B 2 the guarantee wished for, before any email is sent to receiver B 2.

Irrespective of the above guarantee, receiver B 2 may further require, using feedback flags 65 with appropriate queries, that A 1 provide a list of feedback facts 134 containing the user registration, A user ID 100 (EIOU in the instance), the certification authority, the certified list, the certification date and the certification stamp, to be stored in the out filter box 112 at B 2 as previously described in relation with FIG. 5A, within inlist 140, within entry 189 in list 141 associated with sender A 1 according to sender user ID 138 (EIOU in the instance), respectively in entries 206, 207, 208, 209 and 210. The value of the certification stamp 205 is computed at the last minute by filter inbox application 8 at A 1, which uses an encryption algorithm known to cryptography engineers skilled in the art to generate a so-called digest, i.e. a value characteristic of its arguments from which the arguments cannot be easily recovered, based on the certified list 203, the values of all certified facts, the certification date 204, the user registration A user ID 100 (EIOU in the instance) and the filter ID being processed filter ID 80 (DCBA in the instance). Because this value depends on filter ID 80, it is actually duplicated as adhoc fact 93 in an entry in list 91 of adhoc facts using some special code 92 fixed by convention, such as −1, since it corresponds to no label from adhoc vocabulary 33, and it is this value 93 which is fed to the feedback list 134 rather than the value of entry 205. User B 2 is free to require more feedback from A 1, including the explicit values of some of the key certified facts, such as shown in entry 211 for fact n3, but this is not necessary. B 2 has now the possibility to verify the certification claimed by A 1 after the fact, i.e. after having accepted and received the email from A 1, by contacting certification authority E 186 whose identity is given by entry 207. Using for example a direct call to a secure site maintained by E 186, and with the necessary authorizations, B 2 can ask message editing application 9 to send request for verification 192 to E 186, passing along the receiver B user ID 109 together with the formal arguments used to compute the certification stamp 210, taken from out filter box 112, respectively certified list 208, certification date 209, sender ID 206 (EIOU in the instance) and filter ID from B 96 (DCBA in the instance). A special application running at E 186 can use the request 192 to fetch record 188 associated with user ID 197 equal to sender ID 206 (EIOU in the instance), verify that the certified list 199 includes the certified list presented by receiver B 2 based on entry 208, further retrieve the, now possibly shorter, list of certified facts from entries such as 201, compute the certification stamp as filter inbox application 8 at A 1 did, further compute a unique digest from the value of this stamp and the receiver B user ID and return this value to receiver B 2 in exchange 193. If the value contained in exchange 193, from E 186 equals the digest computed from the stamp in entry 210, from A 1, and B 2's user ID 109, receiver B 2 has a further guarantee that A 1's certified facts are as certified, based on the information independently held by the certification authority, even though B 2 may not yet be privy to those facts.

In another embodiment, the decrease in privacy that occurs when facts relative to A 1 are stored at the certification authority E 186's is eliminated at the cost of decreased flexibility. Assuming that A 1 can no longer choose to update any of the certified facts as recorded by the certification authority E 186 in the original certified list 199 without voiding the entire certificate, then E 186 does not need to store any of the facts such as entry 201, but stores instead the certification stamp SE computed at the time of certification as the digest of the certified list 199, the values of all certified facts, only made known to E 186 until the digest is computed, the certification date 200 and the user registration A user ID 197 (EIOU in the instance). This certificate stamp SE is passed along to A 1 inside exchange 191 and stored by A 1 inside entry 205, which does not depend on the receiver. Later when needed, filter inbox application 8 at A 1 generates a new digest, based on the content of entry 205 and the filter ID being processed filter ID 80 (DCBA in the instance), and stores it as an adhoc fact as recited above. Upon receipt of a request from receiver B 2, certification authority E 186 replicates the action of filter inbox application 8 at A 1 based on the pre-recorded value of SE. The rest of the operations remain identical.

It will be immediately apparent to the software engineer skilled in the art that what has been told of B 2's wishes to make sure A 1's facts had been certified by an authorized third party in order to protect the evaluation of his or her filter can be likewise applied to A 1's wishes and B 2's facts to protect the evaluation of A 1's counter-filter 125. The transposition of structures is obvious, for example referring back to FIGS. 5A-5C, the role of list 134 is played by list 123 and that of the out filter box 112 by the mail outbox 21.

The description detailed so far of the current invention does fulfill the goals of providing a rich environment to nurture positive, balanced relationships between unknown senders and receivers, with the means of insuring oneself against misrepresentation of profile facts. It is however another unfortunate fact of life that users or outsiders may try to subvert the system by rigging its technical operation. For example, referring back to FIG. 4, sender SA 1 can try to send email to receiver RX 2 by trying to let mailbox services 14 believe message M 105 has been sent based on a genuine authorization, while actually processing by filter inbox application 8 at SA 1 has somehow been bypassed. The cryptography engineer skilled in the art will know how to best protect against such or other attacks. For example sensitive files such as the ones storing user profiles can be pass phrase-encrypted with the use of a local application running in the corresponding confidential environment, such as 4, by the owner of each profile, such as 16, and known to no other party, or even better, put on a smart card. Communications over the Internet can make use of the "https:" protocol to ensure against eaves dropping. Programs can be communicated using trusted Java applets to ensure against malicious modifications. However it must be recognized that no system is absolutely safe against a determined attack, one for example backed with the means of a state or from a hacker with malicious but otherwise non for profit motives. Once again, what is important and reasonable is to make the cost of an attack higher than the benefit that can normally accrue from its success.

The decentralized nature of the current invention is already a good deterrent as a personal computer is less valuable to attack than a centralized one. While they represent points where information is concentrated, third party services do not weaken the system. One can see that template 11 and directory 12 services deal with public information, while mailbox services 14 simply relay point to point communications which can be strongly encrypted point to point. If a receiver RX 2 can justify the cost, he or she can also elect not to store filter file 99 at third party filter caching services 13 and deliver it directly from filter file 15, again strongly encrypted on a point to point basis. It is further expected that certification services, such as E 186, use very strong security measures, especially in view of the fact they are not required to output any confidential profile information on line to anyone, even when they store it permanently. Finally third party-based verification, for recommendation and certification, makes it even more difficult to attack the operations using this feature since two parties need be subverted before the attack can be truly successful. It is nevertheless a goal of the current invention to further give special protection to what is the most central point of operation: the processing of filters by filter inbox application 8 and of counter-filters by mail inbox application 10.

Figure 9:
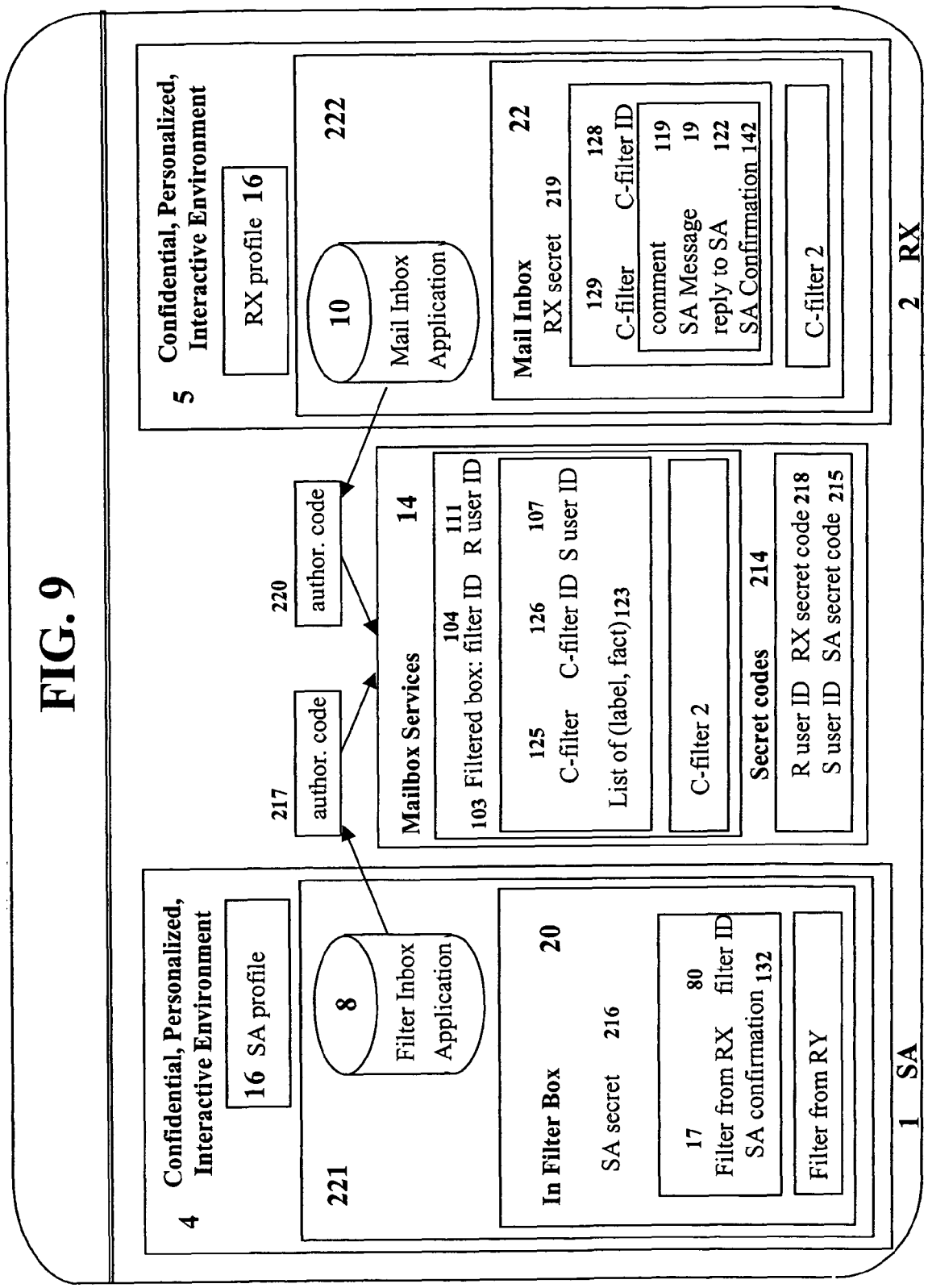
FIG. 9 details the additional data structures of the system according to one embodiment of the present invention for preventing a sender from bypassing the filter built by a receiver to guarantee against spam.

Referring now to FIG. 9, shown are the additional data structures of the system according to one embodiment of the present invention for preventing a sender from bypassing the filter built by a receiver to guarantee against spam. The first measure is to prevent sender SA 1 to simply send message to RX 18 directly to mailbox services 14, bypassing every process carried out within environment 4, especially the determination of whether sender RX is authorized to send a message by filter RX 15, as evaluated by filter inbox application 8, and mimicking the behavior of message editing application 9 once it has received a positive authorization from filter inbox application 8. To that effect mailbox services 14 generates a piece of secret information unique to sender SA which it records as field 215 in a table for secret codes 214 and shares with filter inbox application 8, stored as SA secret 216 in in filter box 20. If sender SA 1 is found by filter inbox application 8 to be authorized, filter inbox application 8 further computes an authorization code based on SA secret 216 and filter ID 80, code sent, given the proper authorization from sender SA 1 as imposed by the privacy capability of environment 4, to mailbox services 14 as information 217 along with message to RX 18. If information 217 is equal to the authorization code computed independently by mailbox services 14, based on SA secret code 215 and filter ID 104, which is equal to filter ID 80, then mailbox services 14 accepts the exchange as genuine, otherwise it rejects it. The protection comes from the fact that sender SA 1 cannot regenerate authorization code 217 without knowing the secret code 216, and that observing the communication of any other proper exchange, such as when another sender SB is authorized by receiver RX 2 or sender SA 1 is authorized by another receiver RY or another filter from RX, would not help as the authorization code 216 depends from both the receiver, via filter ID 80, and the sender, via SA secret 216. While sender SA 1 may well observe the correct authorization code 217 as released by filter inbox application 8 since this code cannot be sent to mailbox services 14 without sender SA 1's inspection and authorization, this would mean sender SA 1 has in fact been properly authorized to send a message to receiver RX 2 and would have no reason to bypass authorization in the first place. The exact way of how secret codes and authorization codes are derived is well known to the cryptography engineer skilled in the art. It will also be obvious to him or her that the same protection carries to mail inbox application 10 at RX 2 and counter filter 129 from SA, using RX secret code 218, shared with receiver RX 2 as RX secret 219 and used to compute and exchange authorization code 220.

In the context of smart-phone based telephony applications, the production of an authorization code is particularly relevant since it allows, in one embodiment of the present invention, both filter inbox application 8 and message editing application 9 to use receiver RX's publicly listed phone number, as the downloading address of Filter from RX 15 for filter inbox application 8, and the way to address mailbox services 14 for message editing application 9. Direct access to mailbox services 14, while made easy to attempt, will fail without the proper authorization code 217. To simplify further what is in fact a new type of custom access special services (CLASS), the user ID (S user ID 100 and R user ID 109) can also be made equal to each user's public phone number. Direct access to mail inbox 22 can either be restricted to the telephone service provider or make use of a second, unlisted phone number. In such an embodiment, the selection of a domain can be carried by additional digits tagged to the user's phone number. Each user can be restricted to upload one filter only per domain. The telephone engineer skilled in the art will recognize that, with the benefit of the present invention, the publication of cellular phone numbers would no longer represent a threat to user privacy and users concerned about their caller ID service receiving faked numbers would have another way to screen out incoming calls.

While the measure detailed above may be sufficient for most cases, a commercial sender SA 1 may still estimate it an economic gain to be able to bypass filter inbox application 8, in view of the large number of mails to be sent. In that case sender SA 1 might invest enough resources in cracking confidential environment 4 and read SA secret 216 or the actual conditions encrypted in filter from RX 17 and be generally able to emulate filter inbox application 8 and message editing application 9. Whatever the case, such a rogue sender still needs to download every RX filter 17 to capture at least its unique filter ID 104. It is therefore possible for a relevant third party, for example filter caching services 13 or the internet access company of sender SA 1, to monitor the number of filter downloads and request that, above a certain threshold, sender SA 1 accept the installation of a hardened environment 221 around filter inbox application 8 and in filter box 20, auditable by the relevant said party. Such tamper-resistant environments are known to security engineers skilled in the art and have been described for example in U.S. patent application 2004/0133793. The purpose of such an environment 221 is to defeat or at least make visible any attempt to access the internal operations of what it encloses. Notice that the introduction of such an environment does not defeat the legitimate protection of sender SA 1 as SA profile 16 sits outside of environment 221 and that confidential environment 4 encapsulates environment 221, preventing in particular any communication with the outside unless they conform to the privacy capability as recited in U.S. Pat. No. 6,092,197 and in European Patent Application No. 98935494.9. The same rule can be applied to environment 222, protecting mailbox mail inbox application 10 and mail inbox 22 from interference by receiver RX 2 if mailbox services 14 for example detect that too many counter filters are downloaded by receiver RX 2. Since the measure described above can be applied irrespective of the exact role of the user, it can be used not only by senders and receivers but by recommenders as well. It should be noticed that, contrary to the levying of a tax on large mail senders, the measure just described is purely technical in nature. In particular the cost of procuring, installing and auditing a tamper-resistant environment does not have to be above any minimum level for the measure to be effective and could in fact become part of the standard computer or smart phone configuration as more and more legitimate users find this extra proof of their good will useful to their reputation.

While certain embodiments according to the invention have been shown and/or described, it should be understood that the invention is not limited to just those embodiments. Various changes, additions, and/or deletions are possible without departing from the spirit and scope of the invention. Also, various combinations of disclosed elements, features, etc. are possible and within the scope of the disclosure even if specific combinations are not expressly described herein.

What is claimed is:

1. A computing system for access by at least one potential sender in order for the potential sender to become acceptable to a receiver and thus be allowed to send one or more electronic messages to the receiver, the potential sender not having yet been determined to be acceptable to the receiver before the potential sender accesses the computing system, the computing system for executing a filter defined by the receiver, the filter including a communication for the potential sender and also including a criterion for applying to at least one fact whose value is to be provided in response to the communication, the computing system comprising:
   a processor; and
   at least one computer readable medium for storing one or more software programs which are executed by the processor to cause the computing system to execute the filter and thereby:
      present the communication to the potential sender to elicit the value of the fact from the potential sender;
      receive the value of the fact from the potential sender;
      provide the value of the fact to the filter;
      make the filter apply the filter's criterion to the value of the fact to determine whether or not the potential sender is acceptable to the receiver;
      receive from the filter the determination about whether the potential sender is acceptable to the receiver; and
      send at least one electronic message from the determined-acceptable potential sender to the receiver, all the while keeping the filter's criterion inaccessible to the potential sender and also keeping the value of the fact confidential and undisclosed to anyone by preventing the value of the fact from leaving the computing system in a form which would enable anyone besides the potential sender, including the receiver and any third party, to learn the value of the fact.

2. The computing system of claim 1 wherein execution of the one or more software programs causes the computing system to keep the criterion inaccessible to the potential sender by maintaining the criterion under encryption.

3. The computing system of claim 1 wherein the computing system comprises a personal computer, a laptop computer, a desktop computer, a workstation computer, or a handheld device.

4. The computing system of claim 3 wherein the handheld device comprises a phone.

5. The computing system of claim 1 wherein the at least one computer readable medium comprises one or more of a hard disk, a CD-ROM, and RAM.

6. The computing system of claim 1 wherein execution of the one or more software programs causes the computing system to store the value of the fact received from the potential sender.

7. The computing system of claim 6 wherein execution of the one or more software programs causes the computing system, in subsequent executions of the filter, to automatically provide the stored value to the filter instead of presenting the communication again to the potential sender and instead of receiving the value back again from the potential sender.

8. The computing system of claim 1 wherein the at least one electronic message comprises a text or a voice message.

9. The computing system of claim 1 wherein the at least one electronic message is sent and received in real time.

10. The computing system of claim 1 wherein the potential sender provides the computing system with the filter.

11. The computing system of claim 1 wherein the potential sender tells the computing system to download the filter from a computing system operated by the receiver.

12. The computing system of claim 1 wherein the potential sender tells the computing system to download the filter from a computing system operated by a third party.

13. The computing system of claim 1 wherein the potential sender tells the computing system to download the filter from an address provided by a third party.

14. The computing system of claim 1 wherein the filter is defined according to a filter template.

15. The computing system of claim 1 wherein the filter comprises an expiration date after which any attempt to apply the filter will fail.

16. The computing system of claim 1 wherein the filter elicits the value of a plurality of facts from the potential sender.

17. The computing system of claim 16 wherein the filter follows a script language to present a plurality of communications, comprising questions and statements, to the potential sender.

18. The computing system of claim 16 wherein the plurality of facts covers a predefined vocabulary of standard facts, the computing system stores the values of the plurality of facts into a profile of the potential sender and automatically provides these profile values to a plurality of filters subsequently defined by a plurality of receivers to elicit the values of facts taken from the vocabulary.

19. The computing system of claim 16 or claim 18 wherein the filter determines the acceptability of the potential sender by applying a plurality of criteria on the values of the plurality of facts according to Boolean logic.

20. The computing system of claim 16 or claim 18 wherein the filter determines the acceptability of the potential sender by computing a score based on the values of the plurality of facts.

21. The computing system of claim 18 wherein the computing system is given an electronic message to send by the potential sender before executing the plurality of filters and automatically sends an instance of the electronic message to each of the plurality of receivers whose filter has determined the potential sender to be acceptable.

22. The computing system of claim 21 wherein the computing system downloads the plurality of filters from an address list provided by a third party.

23. The computing system of claim 21 wherein each of the plurality of filters is defined using one of a plurality of vocabularies, each vocabulary characterizing one of a plurality of domains, and wherein the computing system is further given a plurality of electronic messages, each one attached to a specific domain, and send, when allowed by a filter, an instance of the electronic message whose domain is the same as the domain of the filter.

24. The computing system of claim 21 wherein the electronic message comprises a counter-filter used by the potential sender to determine if the receiver is acceptable to the potential sender and further comprises a communication to be presented to the receiver if the receiver is determined to be acceptable to the potential sender, this communication prompting the receiver to acknowledge this mutual acceptability by sending back a second electronic message to the potential sender, and further wherein the computing system receives the second electronic message from the receiver found acceptable to the potential sender and presents this second electronic message to the potential sender.

25. The computing system of claim 1 wherein the filter further elicits whether the potential sender is recommended or not by a third party known to both the potential sender and the receiver, wherein the acceptability of the potential sender to the receiver further requires that the potential sender be indeed recommended by the third party, and further wherein the recommendation of the potential sender by the third party is disclosed to the receiver as part of the electronic message sent to the receiver, the receiver being able to communicate this recommendation to the third party acting as a recommender to verify its truthfulness.

26. The computing system of claim 22 or 25 wherein the computing system receives from a third party willing to recommend the potential sender a list of addresses, each for a filter defined by a receiver who requires the potential sender to be recommended by the third party.

27. The computing system of claim 25 wherein the filter executed by the computing device comprises an original filter defined by a fourth party as represented by the receiver together with the additional requirement that the potential sender be indeed recommended by the third party and further wherein the message sent by the computing system comprises the communication required for the receiver to verify the truthfulness of the recommendation and a final message to be forwarded by the receiver to the fourth party.

28. The computing system of claim 1 wherein the computing system executes the filter in a tamper-resistant environment to prevent the potential sender from interfering with the determination of the potential sender's acceptability to the receiver.

29. A computing system for access by at least one potential sender in order for the potential sender to become acceptable to a receiver and thus be allowed to send one or more electronic messages to the receiver, the potential sender not having yet been determined to be acceptable to the receiver before the potential sender accesses the computing system, the computing system for executing a filter defined by the receiver, the filter including a criterion for applying to at least one fact whose value is to be provided in response to the filter, the computing system comprising:
a processor; and
at least one computer readable medium for storing one or more software programs which are executed by the processor to cause the computing system to
elicit the value of the fact from the potential sender,
receive the value of the fact from the potential sender, and
store the value of the fact and subsequently to execute the filter and thereby to:
receive a request for the value of the fact from the filter;
automatically provide the stored value of the fact to the filter;
make the filter apply the filter's criterion to the value of the fact to determine whether or not the potential sender is acceptable to the receiver;
receive from the filter the determination about whether the potential sender is acceptable to the receiver; and
send at least one electronic message from the determined-acceptable potential sender to the receiver, all the while keeping the filter's criterion inaccessible to the potential sender and also keeping the value of the fact confidential and undisclosed to anyone by preventing the value of the fact from leaving the computing system in a form which would enable anyone besides the potential sender, including the receiver and any third party, to learn the value of the fact.

30. The computing system of claim 29 wherein the value of a plurality of facts is elicited from the potential sender.

31. The computing system of claim 30 wherein the plurality of facts covers a predefined vocabulary of standard facts, the computing system stores the values of the plurality of facts into a profile of the potential sender and automatically provides these profile values to a plurality of filters subsequently defined by a plurality of receivers to elicit the values of facts taken from the vocabulary.

32. The computing system of claim 30 or claim 31 wherein the filter determines the acceptability of the potential sender by applying a plurality of criteria on the values of the plurality of facts according to Boolean logic.

33. The computing system of claim 30 or claim 31 wherein the filter determines the acceptability of the potential sender by computing a score based on the values of the plurality of facts.

34. The computing system of claim 31 wherein the computing system is given an electronic message to send by the potential sender before executing the plurality of filters and automatically sends an instance of the electronic message to each of the plurality of receivers whose filter has determined the potential sender to be acceptable.

35. The computing system of claim 34 wherein the computing system downloads the plurality of filters from an address list provided by a third party.

36. The computing system of claim 34 wherein each of the plurality of filters is defined using one of a plurality of vocabularies, each vocabulary characterizing one of a plurality of domains, and wherein the computing system is further given a plurality of electronic messages, each one attached to a specific domain, and send, when allowed by a filter, an instance of the electronic message whose domain is the same as the domain of the filter.

37. The computing system of claim 34 wherein the electronic message comprises a counter-filter used by the potential sender to determine if the receiver is acceptable to the potential sender and further comprises a communication to be presented to the receiver if the receiver is determined to be acceptable to the potential sender, this communication prompting the receiver to acknowledge this mutual acceptability by sending back a second electronic message to the potential sender, and further wherein the computing system receives the second electronic message from the receiver found acceptable to the potential sender and presents this second electronic message to the potential sender.

38. The computing system of claim 29 wherein the computing system, either prior to, or as part of, the filter execution, further elicits whether the potential sender is recommended or not by a third party known to both the potential sender and the receiver, wherein the acceptability of the potential sender to the receiver further requires that the potential sender be indeed recommended by the third party, and further wherein the recommendation of the potential sender by the third party is disclosed to the receiver as part of the electronic message sent to the receiver, the receiver being able to communicate this recommendation to the third party acting as a recommender to verify its truthfulness.

39. The computing system of claim 35 or 38 wherein the computing system receives from a third party willing to recommend the potential sender a list of addresses, each for a filter defined by a receiver who requires the potential sender to be recommended by the third party.

40. The computing system of claim 38 wherein the filter executed by the computing device comprises an original filter defined by a fourth party as represented by the receiver together with the additional requirement that the potential sender be indeed recommended by the third party and further wherein the message sent by the computing system comprises the communication required for the receiver to verify the truthfulness of the recommendation and a final message to be forwarded by the receiver to the fourth party.

41. The computing system of claim 29 wherein the computing system executes the filter in a tamper-resistant environment to prevent the potential sender from interfering with the determination of the potential sender's acceptability to the receiver.

* * * * *